US009959286B1

(12) United States Patent
Ely et al.

(10) Patent No.: US 9,959,286 B1
(45) Date of Patent: *May 1, 2018

(54) METHOD, SYSTEM AND APPARATUS FOR SYNCHRONIZING CHANGES IN A DIRECTORY SERVICE

(71) Applicant: UNBOUNDID, CORP., Austin, TX (US)

(72) Inventors: David Ely, Austin, TX (US); Andrew Coulbeck, Austin, TX (US); Trevor Thompson, Austin, TX (US); James Snyder, Austin, TX (US)

(73) Assignee: UNBOUNDID, LLC, Austin, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/181,015

(22) Filed: Jun. 13, 2016

Related U.S. Application Data

(63) Continuation of application No. 13/326,163, filed on Dec. 14, 2011, now Pat. No. 9,367,560.

(51) Int. Cl.
*G06F 17/30* (2006.01)

(52) U.S. Cl.
CPC .. *G06F 17/30174* (2013.01); *G06F 17/30144* (2013.01); *G06F 17/30575* (2013.01); *G06F 17/30581* (2013.01)

(58) Field of Classification Search
CPC ......... G06F 17/30174; G06F 17/30575; G06F 17/30581
USPC ........................................................ 707/634
See application file for complete search history.

(56) References Cited

U.S. PATENT DOCUMENTS

| | | | |
|---|---|---|---|
| 6,536,037 B1 * | 3/2003 | Guheen | G06F 8/71 703/2 |
| 6,539,381 B1 * | 3/2003 | Prasad | G06F 17/30575 |
| 6,721,713 B1 * | 4/2004 | Guheen | G06Q 50/01 705/1.1 |
| 6,957,186 B1 * | 10/2005 | Guheen | G06Q 90/20 705/323 |
| 7,035,847 B2 * | 4/2006 | Brown | G06F 17/30176 |
| 7,315,826 B1 * | 1/2008 | Guheen | G06F 17/3089 703/27 |
| 7,340,447 B2 | 3/2008 | Ghatare | |
| 7,509,310 B1 | 3/2009 | Joshi et al. | |

(Continued)

OTHER PUBLICATIONS

SunOpenDS Standard Edition 2.2 Administration Guide, Sun Microsystems, Inc., PartNo: 821-0506, Dec. 2009 (536 pages).

(Continued)

*Primary Examiner* — Mark E Hershley
(74) *Attorney, Agent, or Firm* — Andrews Kurth Kenyon LLP; Dragan Plavsic

(57) ABSTRACT

In a directory service, a sync request requesting changes to a dataset is received from a sync client, the sync request comprising a token, and sync requests containing tokens are sent to first and second directory servers. Changes are returned by the directory servers with tokens, and the changes are returned to the sync client with a unified token. In embodiments, the changes returned to the sync client are new to the sync client. Also disclosed is a method where a request for new changes to a dataset is received from a sync client, the request including a token, and a response that contains a token and changes that are new to the sync client is returned.

18 Claims, 32 Drawing Sheets

(56) References Cited

U.S. PATENT DOCUMENTS

| | | | | |
|---|---|---|---|---|
| 7,627,658 | B2* | 12/2009 | Levett | G06F 9/46 709/203 |
| 7,664,788 | B2* | 2/2010 | Aust | G06F 17/30067 707/620 |
| 7,673,012 | B2* | 3/2010 | Nakano | H04L 29/06 709/217 |
| 7,779,010 | B2 | 8/2010 | McGarvey | |
| 7,822,781 | B2 | 10/2010 | Greene et al. | |
| 7,860,864 | B2 | 12/2010 | Bell et al. | |
| 7,890,632 | B2 | 2/2011 | Hazlewood et al. | |
| 7,904,487 | B2 | 3/2011 | Ghatare | |
| 7,954,144 | B1 | 5/2011 | Ebrahimi et al. | |
| 8,433,771 | B1* | 4/2013 | Ellsworth | H04L 67/125 709/213 |
| 2002/0147611 | A1* | 10/2002 | Greene | G06Q 10/063112 705/1.1 |
| 2002/0161860 | A1* | 10/2002 | Godlin | G06F 17/30212 709/219 |
| 2002/0173984 | A1* | 11/2002 | Robertson | G06Q 10/10 709/220 |
| 2003/0050996 | A1* | 3/2003 | Yohe | G06T 9/00 709/217 |
| 2004/0225632 | A1* | 11/2004 | Benson | G06F 17/30575 |
| 2005/0050104 | A1* | 3/2005 | Kadyk | G06F 9/542 |
| 2005/0216421 | A1* | 9/2005 | Barry | G06F 11/0709 705/64 |
| 2006/0168118 | A1* | 7/2006 | Godlin | G06F 17/30212 709/218 |
| 2006/0190616 | A1* | 8/2006 | Mayerhofer | H04L 67/20 709/231 |
| 2008/0168106 | A1* | 7/2008 | Freedman | G06F 17/30575 |
| 2008/0256020 | A1* | 10/2008 | Wakefield | H04L 29/12169 |
| 2008/0256082 | A1* | 10/2008 | Davies | G06F 17/30545 |
| 2010/0145908 | A1* | 6/2010 | Freedman | G06F 17/30575 707/610 |
| 2010/0169392 | A1* | 7/2010 | Lev Ran | G06F 9/546 707/827 |
| 2010/0174690 | A1* | 7/2010 | Marcotte | G06F 17/30174 707/695 |
| 2011/0016087 | A1* | 1/2011 | Freedman | G06F 17/30581 707/617 |
| 2011/0252071 | A1* | 10/2011 | Cidon | G06F 17/30174 707/802 |
| 2012/0265836 | A1* | 10/2012 | Nemoto | G06F 17/30153 709/211 |
| 2012/0330887 | A1* | 12/2012 | Young | G06F 17/30017 707/610 |
| 2013/0117400 | A1* | 5/2013 | An | H04L 63/0823 709/206 |

OTHER PUBLICATIONS

Good, Gordon, Internet Draft of Definition of an Object Class to Hold LDAP Change Records, Change Record Object Class Definition, Filename: draft-qood-ldap-chancieloq-OO.txt, Change Record Object Class Definition, Mar. 11, 1998, Netscape Communications, pp. 1-16, Mountain View, CA.
McClain, Nancy, About NOS Objects, Developer Net Univerty, Oct. 18, 2000, pp. 1-4, Copyright 2014 Novell.
Replicating Directory Data pp. 333-367 of SunOpenDS Standard Edition 2.2 Administration Guide, Sun Microsystems, Inc., PartNo: 821-0506, Dec. 2009 (35 pages).
Donnelly, Michael, An Introduction to LDAP, ldapman.org, dated Apr. 28, 2000.
Zeilenga, K. Choi, J.H., The Lightweight Directory Access Protocol (LDAP), Content Synchronization Operation, Experimental, Jun. 2006, The Internet Society.
Henry, Gavin, OpenLDAP Replication Strategies, Part of the Suretec Group, www.suretecgroup.com, http://creativecommons.org.licenses/by/3.0, dated Apr. 2, 2009, pp. 1-31.
Sun Java System Directory Server Enterprise Edition 6.2 Reference, Part I Directory Server Reference, Chapter 4 Directory Server Replication, Replication and the Retro Change Log Plug-In,Oracle Corporation and/or its affiliates 2010.
Chapter 7 Replication & Referral, zytrax.com, 1994-2011 ZyTrax, Inc., page modified Jul. 11, 2011.
LDAP Sync Replication, Section 14, OpenLDAP Admin Guide 2.2, 2003.
The Proxy Cache Engine, Section 16, OpenLDAP Admin Guide, 2008.
Replication, Section 18, OpenLDAP Admin Guide 2.4, 2011.
Replication with slurpd, Section 14, OpenLDAP Admin Guide, 2008.
LDAP Sync Replication, Section 15, OpenLDAP Admin Guide, 2008.
Introduction to OpenLDAP Directory Services, OpenLDAP Admin Guide, OpenLDAP Foundation, 2011.
Chu, Howard Y., Change Sequence Numbers For LDAP, Symas Corporation, Dec. 1, 2004.
Sun Directory Server Enterprise Edition 7.0 Reference, Replication and the retro change Log plug-in, 2010.
Good, Gordon, Poitou, Ludovic; Internet draft draft-good-ldap-changelog-04.txt, Definition of an Object Class to Hold LDAP Change Records, Mar. 1, 2003, http://www.ietf.org/ietf/1id-abstracts.txt, The Internet Society (2003).
Merrells, John, Reed, Ed, Srinivasan, Uppili, Internet-Draft draft-ietf-ldup-model-06.txt, LDAP Replication Architecture, Mar. 2, 2000, http://www.ietf.org/ietf/1 id-abstracts.txt, The Internet Society (1998, 1999,2000).
Bahloul, Sebastien, Clarke, Jonathan, Powerpoint presentation on LSC @ 2011 . RMLL, LSC Project, Ldap Synchronization Connector, http://lsc-project.org, Jul. 13, 2011, pp. 1-40.
OpenLDAP section on wikipedia, "http://en.wikipedia.org/wiki/OpenLDAP," modified on Jul. 24, 2011.
HP Proliant Intel-based 300-series G6 and G7 servers technology brief, Apr. 2010, pp. 1-24, Hewlett-Packard Development Company L. P. 2010.
QuickSpecs, HP Proliant BL490c Generation 6 (G6) Server Blade, DA 13236 Worldwide, Version 14, Jan. 10, 2011, pp. 1-34, Hewlett-Packard Development Company L. P. 2011.
Langley, Todd, Kowalczyk, Rob, Introduction to Intel Architecture, The Basics, pp. 1-29, Jan. 2009, Intel Corporation, 2008.
Lightweight Directory Access Protocol section on wikipedia, "http://en.wikipedia.org/wiki/Lightweight_Directory_Access_Protocol," updated Sep. 23, 2011.
Lightweight Directory Access Protocol section on wikipedia, "http://en.wikipedia.org/wiki/Lightweight_Directory_Access_Protocol," updated Jul. 7, 2011.
UnboundiD Synchronization Server Product Description, Version 3.1, Apr. 19, 2011.
LDAP Data Interchange Format section on wikipedia, http://en.wikipedia.org/w/index.php?, modified on Sep. 23, 2011.
Class ChangelogEntry, com.unboundid.ldap.sdk, UnboundiD Corp., 2011.
UnboundlD Directory Server Product Description, Version 3.0, Jan. 10, 2011.
UnboundiD Directory Proxy Server Product Description, Version 3.0, Jan. 5, 2011.
Sun Java System Directory Server Enterprise Edition 6.2 Reference, Part I Directory Server Reference, Chapter 4 Directory Server Replication, Replication Configurations,Oracle Corporation and/or its affiliates 2010.
File History from U.S. Appl. No. 13/326,163, filed Dec. 14 2011.

* cited by examiner

SyncRequest = {
  resumeToken=token, ⟋251
  maxResults=10,
  includeBase={ou=admin, dc=example, dc=com; ou=sales, dc=example, dc=com; ou=users, dc=example, dc=com}
}

FIG. 4B

251 token = {
  "ou=admin, dc=example, dc=com" -> ⟋440
    {{221, 9:57:01, 1001}, ⟋445
    {227, 9:57:01, 1001},
    {231, 9:57:01, 1001},
    {237, 9:57:01, 1001}},
  "ou=sales, dc=example, dc=com" -> ⟋450
    {{205, 10:00:01, 1001},
    {206, 9:56:31, 1001}},
  "ou=users, dc=example, dc=com (Set 1)" -> ⟋460
    {{222, 10:02:01, 1001},
    {232, 9:59:01, 1001}},
  "ou=users, dc=example, dc=com (Set 2)" -> ⟋470
    {{226, 10:00:17, 1001},
    {236, 10:02:33, 1001}}
}

SyncRequest = {
  resumeToken=token, ⟋271
  maxResults=10, ⟋270
  includeBase={ou=admin, dc=example, dc=com; ou=sales, dc=example, dc=com; ou=users, dc=example, dc=com}
}

FIG. 5B

271 token = {
   {221, 9:57:01, 1001},
   {227, 9:57:01, 1001},
   {231, 9:57:01, 1001},
   {237, 9:57:01, 1001},
   {205, 10:00:01, 1001},
   {206, 9:56:31, 1001},
   {222, 10:02:01, 1001},
   {232, 9:59:01, 1001}
}

SyncRequest = {
  resumeToken=token, — 279
  maxResults=10, — 280
  includeBase={ou=users, dc=example, dc=com}
}

FIG. 6B

279 token = {
   {226, 10:00:17, 1001},
   {236, 10:02:33, 1001}
}

FIG. 7

700 token = {
   {226, 10:04:12, 1001},
   {236, 10:02:33, 1001}
}

FIG. 8
800 token = {
   {226, 10:04:12, 1002},
   {236, 10:02:33, 1001}
}

FIG. 9
900 token = {
   "ou=admin, dc=example, dc=com" -> /―940
    {{221, 10:05:01, 1001},
    {227, 9:57:01, 1001},
    {231, 9:57:01, 1001},
    {237, 9:57:01, 1001}},
   "ou=sales, dc=example, dc=com" -> /―950
    {{205, 10:04:32, 1001},
    {206, 9:56:31, 1001}},
   "ou=users, dc=example, dc=com Set 1" -> /―960
    {{222, 10:02:01, 1001},
    {232, 10:03:21, 1001}},
   "ou=users, dc=example, dc=com Set 2" -> /―970
    {{226, 10:04:12, 1002},
    {236, 10:02:33, 1001}}
}

FIG. 10A
256

SyncRequest = {
   resumeToken=token, /―257
   maxResults=10, /―258
   includeBase={ou=admin, dc=example, dc=com, ou=sales, dc=example, dc=com, ou=users, dc=example, dc=com}
}

FIG. 10B
257

```
token = {
    "ou=admin, dc=example, dc=com" ->         /— 940
        {{221, 10:05:01, 1001},
         {227, 9:57:01, 1001},
         {231, 9:57:01, 1001},
         {237, 9:57:01, 1001}},
    "ou=sales, dc=example, dc=com" ->         /— 950
        {{205, 10:04:32, 1001},
         {206, 9:56:31, 1001}},
    "ou=users, dc=example, dc=com Set 1" ->   /— 960
        {{222, 10:02:01, 1001},
         {232, 10:03:21, 1001}},
    "ou=users, dc=example, dc=com Set 2" ->   /— 970
        {{226, 10:04:12, 1002},
         {236, 10:02:33, 1001}}
}
```

FIG. 11A
284

```
SyncRequest = {
    resumeToken=token,    /— 285
    maxResults=10,                                       /— 286
    includeBase={ou=sales, dc=example, dc=com; ou=users, dc=example, dc=com}
}
```

FIG. 11B
285

```
token = {
    {205, 10:04:32, 1001},
    {206, 9:56:31, 1001},
    {222, 10:02:01, 1001},
    {232, 10:03:21, 1001}
}
```

FIG. 11C
1110

```
token = {
    {205, 10:04:32, 1001},
    {206, 9:56:31, 1001},
    {222, 10:06:01, 1001},
    {232, 10:03:21, 1001}
}
```

FIG. 11D
1120

```
token = {
    {205, 10:04:32, 1001},
    {206; 10:06:36; 1001},
    {222, 10:06:01, 1001},
    {232, 10:03:21, 1001}
}
```

FIG. 11E
1130

```
token = {
    {205, 10:04:32, 1001},
    {206; 10:06:36; 1001},
    {222; 10:06:44; 1001}
    {232, 10:03:21, 1001}
}
```

FIG. 12A
299

```
SyncRequest = {
    resumeToken=token,           /— 247
    maxResults=10,                              /— 248
    includeBase={ou=admin, dc=example, dc=com; ou=users, dc=example, dc=com}
}
```

FIG. 12B

247 token = {
    {221, 10:05:01, 1001},
    {227, 9:57:01, 1001},
    {231, 9:57:01, 1001},
    {237, 9:57:01, 1001},
    {226, 10:05:12, 1002},
    {236, 10:02:33, 1001}
}

Final Result = {
token = { —1300
    {221, 10:05:01, 1001},
    {227, 9:57:01, 1001},
    {231, 9:57:01, 1001},
    {237, 9:57:01, 1001},
    {205, 10:04:32, 1001},
    {206, 9:56:31, 1001},
    {222, 10:02:01, 1001},
    {232; 10:03:21; 1001}}
}

FIG. 14

1400 token = {
    {221, 10:05:01, 1001},
    {227, 10:05:19, 1001},
    {231, 9:57:01, 1001},
    {237, 9:57:01, 1001},
    {226, 10:06:50, 1001},
    {236, 10:02:33, 1001}
}

FIG. 15

```
1500
  \
token = {
  "ou=admin, dc=example, dc=com" ->
    {{221, 10:05:01, 1001},
     {227, 9:57:01, 1001},
     {231, 9:57:01, 1001},
     {237, 9:57:01, 1001}},
  "ou=sales, dc=example, dc=com" ->
    {{205, 10:04:32, 1001},
     {206, 10:06:36, 1001}},
  "ou=users, dc=example, dc=com Set 1" ->
    {{222, 10:05:19, 1001},
     {232, 10:03:21, 1001}},
  "ou=users, dc=example, dc=com Set 2" ->
    {{226, 10:05:12, 1002},
     {236, 10:02:33, 1001}}
}
```

FIG. 16A

```
262
  \
SyncRequest = {
  resumeToken=token,         /–263
  maxResults=10,             /–264
  includeBase={ou=users, dc=example, dc=com}
}
```

```
token = {
  "ou=users, dc=example, dc=com  Set 1" ->
    {{222, 9:58:01, 1001},
     {232, 9:59:01, 1001}},
  "ou=users, dc=example, dc=com  Set 2" ->
    {{226, 10:00:17, 1001},
     {236, 9:58:01, 1001}}
}
```

```
SyncRequest = {
  resumeToken=token,                              ─ 277
  maxResults=10,
  includeBase={ou=users, dc=example, dc=com}     ─ 276
}
```

```
token = {
  {222, 9:58:01, 1001},
  {232, 9:59:01, 1001},
}
```

```
SyncRequest = {
  resumeToken=token,                              ─ 295
  maxResults=10,
  includeBase={ou=users, dc=example, dc=com}     ─ 294
}
```

```
token = {
    {226, 10:00:17, 1001},
    {236, 9:58:01, 1001}
}
```

```
token = {
    {222, 10:06:01, 1001},
    {232, 10:03:21, 1001}
}
```

```
token = {
    {226, 10:04:12, 1002},
    {236, 10:02:33, 1001}
}
```

```
proxy token = {
  "ou=users, dc=example, dc=com  Set 1" ->
    {222, 10:06:01, 1001},
    {232, 10:03:21, 1001}},
  "ou=users, dc=example, dc=com  Set 2" ->
    {{226, 10:04:12, 1002},
    {236, 10:02:33, 1001}}
}
```

| Change Log Number | Replica ID | CSN Time | Seq. No. | Change Contents — Changed Entry & Change Type | Attribute Changes |
|---|---|---|---|---|---|
| 5025 | 205 | 9:56:01 | 1001 | targetdn: uid=sales1, ou=sales, dc=example, dc=com<br>changetype: modify | replace: st<br>st: TX |
| 2221 — 5026 | 206 | 9:56:31 | 1001 | targetdn: uid=sales2, ou=sales, dc=example, dc=com<br>changetype: modify | replace: st<br>st: TX |
| 2222 — 5027 | 221 | 9:57:01 | 1001 | targetdn: uid=admin1, ou=admin, dc=example, dc=com<br>changetype: modify | replace: st<br>st: TX |
| 2223 — 5028 | 231 | 9:57:01 | 1001 | targetdn: uid=admin2, ou=admin, dc=example, dc=com<br>changetype: modify | replace: st<br>st: TX |
| 2224 — 5029 | 227 | 9:57:01 | 1001 | targetdn: uid=admin3, ou=admin, dc=example, dc=com<br>changetype: modify | replace: st<br>st: TX |
| 2225 — 5030 | 237 | 9:57:01 | 1001 | targetdn: uid=admin4, ou=admin, dc=example, dc=com<br>changetype: modify | replace: st<br>st: TX |
| 2226 — 5031 | 222 | 9:58:01 | 1001 | targetdn: uid=user1, ou=users, dc=example, dc=com<br>changetype: modify | replace: st<br>st: TX |
| 2227 — 5032 | 232 | 9:59:01 | 1001 | targetdn: uid=user2, ou=users, dc=example, dc=com<br>changetype: modify | replace: st<br>st: TX |
| 2228 — 5033 | 205 | 10:00:01 | 1001 | targetdn: uid=sales3, ou=sales, dc=example, dc=com<br>changetype: modify | replace: st<br>st: TX |
| 2205 — 5034 | 222 | 10:02:01 | 1001 | targetdn: uid=user3, ou=users, dc=example, dc=com<br>changetype: modify | replace: st<br>st: TX |
| 2241 — 5035 | 232 | 10:03:21 | 1001 | targetdn: uid=user4, ou=users, dc=example, dc=com<br>changetype: modify | replace: st<br>st: TX |
| 2242 — 5036 | 205 | 10:04:32 | 1001 | targetdn: uid=sales4, ou=sales, dc=example, dc=com<br>changetype: modify | replace: st<br>st: TX |
| 2243 — 5037 | 221 | 10:05:01<br>2211 — 10:05:05 | 1001 | targetdn: uid=admin5, ou=admin, dc=example, dc=com<br>changetype: modify | replace: st<br>st: TX |
| 2244 — 5038 | 222 | 10:06:01<br>2212 — 10:06:12 | 1001 | targetdn: uid=user5, ou=users, dc=example, dc=com<br>changetype: modify | replace: st<br>st: TX |
| 2245 — 5039 | 206 | 10:06:36 | 1001 | targetdn: uid=sales5, ou=sales, dc=example, dc=com<br>changetype: modify | replace: st<br>st: TX |
| 2246 — 5040 | 227 | 10:05:19 | 1001 | targetdn: uid=admin6, ou=admin, dc=example, dc=com<br>changetype: modify | replace: st<br>st: TX |
| 2247 — 5041 | 222 | 10:06:44<br>2213 — 10:06:59 | 1001 | targetdn: uid=user6, ou=users, dc=example, dc=com<br>changetype: modify | replace: st<br>st: TX |

FIG. 22A

| Change Log Number | Replica ID | CSN Time | Seq. No. | Change Contents Changed Entry & Change Type | Attribute Changes |
|---|---|---|---|---|---|
| 596 | 221 | 9:56:01 | 1001 | targetdn: uid=admin1, ou=admin, dc=example, dc=com<br>changetype: modify | replace: st<br>st: TX |
| 597 | 231 | 9:56:31 | 1001 | targetdn: uid=admin2, ou=admin, dc=example, dc=com<br>changetype: modify | replace: st<br>st: TX |
| 598 | 237 | 9:57:01 | 1001 | targetdn: uid=admin4, ou=admin, dc=example, dc=com<br>changetype: modify | replace: st<br>st: TX |
| 599 | 236 | 9:58:01 | 1001 | targetdn: uid=user7, ou=users, dc=example, dc=com<br>changetype: modify | replace: st<br>st: TX |
| 600 | 226 | 9:59:01 | 1001 | targetdn: uid=user7, ou=users, dc=example, dc=com<br>changetype: modify | replace: st<br>st: TX |
| 601 | 226 | 10:00:17 | 1001 | targetdn: uid=user8, ou=users, dc=example, dc=com<br>changetype: modify | replace: st<br>st: TX |
| 602 | 236 | 10:02:33 | 1001 | targetdn: uid=user9, ou=users, dc=example, dc=com<br>changetype: modify | replace: st<br>st: TX |
| 603 | 226 | 10:04:12 | 1001 | targetdn: uid=user10, ou=users, dc=example, dc=com<br>changetype: modify | replace: st<br>st: TX |
| 604 | 226 | 10:04:12<br>2214 — 10:05:05 | 1002 | targetdn: uid=user11, ou=users, dc=example, dc=com<br>changetype: modify | replace: st<br>st: TX |
| 605 | 221 | 10:05:01 | 1001 | targetdn: uid=admin5, ou=admin, dc=example, dc=com<br>changetype: modify | replace: st<br>st: TX |
| 606 | 227 | 10:05:19<br>2215 — 10:06:12 | 1001 | targetdn: uid=admin6, ou=admin, dc=example, dc=com<br>changetype: modify | replace: st<br>st: TX |
| 607 | 226 | 10:06:23 | 1001 | targetdn: uid=user12, ou=users, dc=example, dc=com<br>changetype: modify | replace: st<br>st: TX |
| 608 | 226 | 10:06:50<br>2216 — 10:06:59 | 1001 | targetdn: uid=user13, ou=users, dc=example, dc=com<br>changetype: modify | replace: st<br>st: TX |

FIG. 22B

```
SyncRequest ::= SEQUENCE {
    starting Point     CHOICE {
        resumeWithToken        [0] OCTET STRING,
        resumeWithCSN          [1] OCTET STRING,
        beginningOfChangelog   [2] NULL,
        endOfChangelog         [3] NULL,
        changeTime             [4] OCTET STRING,
        ... },
    maxChanges           INTEGER (0 .. maxInt),                      ⟵ 2520
    maxTimeMillis        [0] INTEGER DEFAULT 0,                      ⟵ 2525
    waitForMaxChanges    [1] BOOLEAN DEFAULT FALSE,                  ⟵ 2530
    includeBase          [2] SEQUENCE OF LDAPDN OPTIONAL,            ⟵ 2535
    excludeBase          [3] SEQUENCE OF LDAPDN OPTIONAL,            ⟵ 2540
    changeTypes          [4] SET OF ENUMERATED {                     ⟵ 2545
        add      (0),
        delete   (1),
        modify   (2),
        modifyDN (3) } OPTIONAL,
    continueOnMissingChanges   [5] BOOLEAN DEFAULT FALSE,            ⟵ 2550
    pareEntriesForUserDN       [6] LDAPDN OPTIONAL,                  ⟵ 2555
    changeSelectionCriteria    [7] CHOICE                            ⟵ 2560
        anyAttributes      [1] SEQUENCE OF LDAPString,
        allAttributes      [2] SEQUENCE OF LDAPString,
        ignoreAttributes   [3] SEQUENCE {
            ignoreAttributes            SEQUENCE OF LDAPString
            ignoreOperationalAttributes BOOLEAN,
            ... },
        ... } OPTIONAL
    ... }
```

```
                                                    ⟵ 2600
ChangelogResumeToken ::= SEQUENCE {
    tokenType       INTEGER,    -- Always 1 for this resume token
    tokenVersion    INTEGER,    -- Currently always version 1
    server ID       OCTET STRING,
    changelogNumber INTEGER,
    lastCSNs        SEQUENCE OF ChangeSequenceNumber
}                              ⟍2610
```

Fig. 26B

```
                                        ⟵ 2610
ChangeSequenceNumber ::= SEQUENCE {
    replicaID       INTEGER,
    timestamp   OCTET STRING,
    SequenceNumber  INTEGER,
}
```

ProxyResumeToken ::= SEQUENCE {
    tokenType    INTEGER,    -- Always 2 for this resume token
    tokenVersion  INTEGER,    -- Currently always version 1
    server ID    OCTET STRING,
    tokenInfo    SEQUENCE OF ServerTokenInfo — 2710
}                     2720

ServerTokenInfo ::= SEQUENCE {
    serverSetID  OCTET STRING, — 2730
    resumeToken  ChangelogResumeToken — 2600
}

SyncResponse ::= SEQUENCE {
    resumeToken             [0] OCTET STRING OPTIONAL,
    moreChangesAvailable     [1] BOOLEAN,
    changesAlreadyPurged     [2] BOOLEAN DEFAULT FALSE,
    additionalInfo          [3] OCTET STRING OPTIONAL,
    estimatedChangesRemaining    [4] INTEGER (0 .. MAXINT) OPTIONAL,
    ... }

ChangeLog EntryIntermediateResponse ::= SEQUENCE {
    resumeToken        OCTET STRING,
    ChangeLogEntry }

FIG. 30B

3010 intermediate sync response = {
    token, —— 3015 change = { —— 3016 targetdn: uid=user4,ou=users, dc=example, dc=com
        changetype: modify
        replace: st
        st: TX
    }
}

FIG. 30C

3015 token = {
   {221, 9:57:01, 1001},
   {227, 9:57:01, 1001},
   {231, 9:57:01, 1001},
   {237, 9:57:01, 1001},
   {205, 10:05:01, 1001},
   {206, 9:56:31, 1001},
   {222, 10:02:01, 1001},
   {232; 10:03:21; 1001}, —— 3017
}

FIG. 30D

3020 intermediate sync response = {
    token, ─── 3025
    change = { ─── 3026
        targetdn: uid=sales4,ou=sales, dc=example, dc=com
        changetype: modify
        replace: st
        st: TX
}

FIG. 30E

3025 token = {
   {221, 9:57:01, 1001},
   {227, 9:57:01, 1001},
   {231, 9:57:01, 1001},
   {237, 9:57:01, 1001},
   {205, 10:04:32, 1001}, ─── 3027
   {206, 9:56:31, 1001},
   {222, 10:02:01, 1001},
   {232; 10:03:21; 1001}
}

FIG. 30F

3030 intermediate sync response = {
    token, ─── 3035
    change = { ─── 3036
        targetdn: uid=admin5,ou=admin, dc=example, dc=com
        changetype: modify
        replace: st
        st: TX
    }
}

FIG. 30G

3035 token = {
    {221, 10:05:01, 1001}, ⟋ 3037
    {227, 9:57:01, 1001},
    {231, 9:57:01, 1001},
    {237, 9:57:01, 1001},
    {205, 10:04:32, 1001},
    {206, 9:56:31, 1001},
    {222, 10:02:01, 1001},
    {232; 10:03:21; 1001}}

FIG. 30H token = { ⟋ 3045
  "ou=admin, dc=example, dc=com" ->
    {{221, 9:57:01, 1001},
    {227, 9:57:01, 1001},
    {231, 9:57:01, 1001},
    {237, 9:57:01, 1001}},
  "ou=sales, dc=example, dc=com" ->
    {{205, 10:00:01, 1001},
    {206, 9:56:31, 1001}},
  "ou=users, dc=example, dc=com Set 1" ->
      {{222, 10:02:01, 1001},
      {232; 10:03:21; 1001}},
  "ou=users, dc=example, dc=com Set 2" ->
    {{226, 10:00:17, 1001},
    {236, 10:02:33, 1001}}
}

FIG. 30I token = { ⟋ 3050
  "ou=admin, dc=example, dc=com" ->
    {{221, 9:57:01, 1001},
    {227, 9:57:01, 1001},
    {231, 9:57:01, 1001},
    {237, 9:57:01, 1001}},
  "ou=sales, dc=example, dc=com" ->
    {{205, 10:00:01, 1001},
    {206, 9:56:31, 1001}},
  "ou=users, dc=example, dc=com Set 1" ->
      {{222, 10:02:01, 1001},
      {232; 10:03:21; 1001}},
  "ou=users, dc=example, dc=com Set 2" ->
      {{226, 10:04:12, 1001},
      {236, 10:02:33, 1001}}
}

FIG. 30J token = { ⟋ 3055
  "ou=admin, dc=example, dc=com" ->
    {{221, 9:57:01, 1001},
    {227, 9:57:01, 1001},
    {231, 9:57:01, 1001},
    {237, 9:57:01, 1001}},
  "ou=sales, dc=example, dc=com" ->
    {{205, 10:00:01, 1001},
    {206, 9:56:31, 1001}},
  "ou=users, dc=example, dc=com Set 1" ->
      {{222, 10:02:01, 1001},
      {232; 10:03:21; 1001}},
  "ou=users, dc=example, dc=com Set 2" ->
      {{226, 10:04:12, 1002},
      {236, 10:02:33, 1001}}
}

FIG. 30K

```
token = {  ╱─3060
  "ou=admin, dc=example, dc=com" ->
    {{221, 9:57:01, 1001},
     {227, 9:57:01, 1001},
     {231, 9:57:01, 1001},
     {237, 9:57:01, 1001}},
  "ou=sales, dc=example, dc=com" ->
       {{205, 10:04:32, 1001},
        {206, 9:56:31, 1001}},
  "ou=users, dc=example, dc=com  Set 1" ->
       {{222, 10:02:01, 1001},
        {232; 10:03:21; 1001}},
  "ou=users, dc=example, dc=com  Set 2" ->
       {{226, 10:04:12, 1002},
        {236, 10:02:33, 1001}}
}
```

FIG. 30L

```
token = {  ╱─3065
  "ou=admin, dc=example, dc=com" ->
       {{221, 10:05:01, 1001},
        {227, 9:57:01, 1001},
        {231, 9:57:01, 1001},
        {237, 9:57:01, 1001}},
  "ou=sales, dc=example, dc=com" ->
       {{205, 10:04:32, 1001},
        {206, 9:56:31, 1001}},
  "ou=users, dc=example, dc=com  Set 1" ->
        {{222, 10:02:01, 1001},
         {232; 10:03:21; 1001}},
  "ou=users, dc=example, dc=com  Set 2" ->
        {{226, 10:04:12, 1002},
         {236, 10:02:33, 1001}}
}
```

\# Token returned by DS
ChangelogResumeToken ::= SEQUENCE {
    lastCSNs     SEQUENCE OF ChangeSequenceNumber,
    server ID     OCTET STRING,
    changelogNumber INTEGER
}

FIG. 32

3200 token = {
    {221, 10:05:01, 1001},
    {227, 9:57:01, 1001},
    {231, 9:57:01, 1001},
    {237, 9:57:01, 1001},
    {205, 10:04:32, 1001},
    {206, 9:56:31, 1001},
    {222, 10:02:01, 1001},
    {232, 10:03:21, 1001},
    server ID=220,
    changeNumber=5037
}

FIG. 33

3300 token = {
    {{226, 10:04:12, 1002},
    {236, 10:02:33, 1001},
    server ID=225,
    changeNumber=0604
}

```
token = {
  "ou=admin, dc=example, dc=com" ->
    {{221, 10:05:01, 1001},
    {227, 9:57:01, 1001},
    {231, 9:57:01, 1001},
    {237, 9:57:01, 1001},
    server ID=220,
    changeNumber=5037},
  "ou=sales, dc=example, dc=com" ->
    {{205, 10:04:32, 1001},
    {206, 9:56:31, 1001},
    server ID=220,
    changeNumber=5037},
  "ou=users, dc=example, dc=com  Set 1" ->
    {{222, 10:02:01, 1001},
    {232, 10:03:21, 1001},
    server ID=220,
    changeNumber=5037},
  "ou=users, dc=example, dc=com  Set 2" ->
    {{226, 10:04:12, 1002},
    {236, 10:02:33, 1001},
    server ID=225,
    changeNumber=0604}
}
```

```
token = {
  {205, 10:04:32, 1001},
  {206, 9:56:31, 1001},
  {222, 10:02:01, 1001},
  {232, 10:03:21, 1001},
  server ID=220,
  changeNumber=5037
}
```

FIG. 36
3600 token = {
　　{221, 10:05:01, 1001},
　　{227, 9:57:01, 1001},
　　{231, 9:57:01, 1001},
　　{237, 9:57:01, 1001},
　　{226, 10:04:12, 1002},
　　{236, 10:02:33, 1001}
}

FIG 37
3700 token = {
　　{205, 10:04:32, 1001},
　　{206, 10:06:36, 1001},
　　{222, 10:05:19, 1001},
　　{232, 10:03:21, 1001},
　　server ID=220,
　　changeNumber=5041
}

FIG. 38
3800 token = {
　　{221, 10:05:01, 1001},
　　{227, 10:05:19, 1001},
　　{231, 9:57:01, 1001},
　　{237, 9:57:01, 1001},
　　{226, 10:06:50, 1001},
　　{236, 10:02:33, 1001},
　　server ID=225,
　　changeNumber=608
}

```
token = {
  "ou=admin, dc=example, dc=com" ->
    {{221, 10:05:01, 1001},
    {227, 9:57:01, 1001},
    {231, 9:57:01, 1001},
    {237, 9:57:01, 1001},
    server ID=225,
    changeNumber=608},
  "ou=sales, dc=example, dc=com" ->
    {{205, 10:04:32, 1001},
    {206, 10:06:36, 1001},
    server ID=220,
    changeNumber=5041},
  "ou=users, dc=example, dc=com Set 1" ->
    {{222, 10:05:19, 1001},
    {232, 10:03:21, 1001},
    server ID=220,
    changeNumber=5041},
  "ou=users, dc=example, dc=com Set 2" ->
    {{226, 10:06:50, 1001},
    {236, 10:02:33, 1001},
    server ID=225,
    changeNumber=608}
}
```

METHOD, SYSTEM AND APPARATUS FOR SYNCHRONIZING CHANGES IN A DIRECTORY SERVICE

CROSS-REFERENCE TO RELATED APPLICATIONS

This application is a continuation and claims the priority of U.S. patent application Ser. No. 13/326,163, entitled "Method, System and Apparatus for Synchronizing Changes In a Directory Service," filed Dec. 14, 2011, which is hereby incorporated by reference.

FIELD

Embodiments of the method, system and apparatus claimed herein relate to a directory service, specifically, the field of synchronizing changes out of one or more directory servers.

BACKGROUND

A directory is a map between names and values. In a telephone directory, the nodes are names and the data items are telephone numbers. In a domain name server, the nodes are domain names and the data items are IP addresses (and aliases, mail server names, etc.). A directory server is a computer server system that stores, organizes and provides access to information in a directory. A directory service is the software system implemented on one or more computers, including directory servers. A directory service typically provides an organized set of records, such as a corporate email directory. A directory service may have a hierarchical data structure. LDAP, or Lightweight Directory Access Protocol, is an application protocol for maintaining distributed directory information services over an Internet Protocol (IP) network. Version 3 of the LDAP protocol (LDAPv3) was first published in 1997 and is in widespread use today.

An LDAP directory often is depicted as a tree, with the root node at the top. An entry is the basic unit of information in an LDAP directory. Each entry includes data for one or more attributes. Each entry has a unique name, the "distinguished name" or "DN." As between all leaf nodes of a single parent node, each sibling has a unique entry, referred to as the RDN, or relative distinguished name, and the DN is the combination of all RDNs in the path from the entry to the root of the directory tree. To illustrate, take the directory entry: cn=john smith, ou=users, dc=example, dc=com. The DN for the entry is cn=john smith, ou=users, dc=example, dc=com, and the RDN is cn=john smith. For this entry, john smith is the data value for the attribute cn (common name), users is the data value for the attribute ou (organizational unit), and the data values for the attribute dc (domain component) are example and com.

In many directory service installations the directory contents may be stored on multiple systems. Indeed, a single directory may have multiple identical replicas, each of which can be independently modified. Synchronization is a mechanism for keeping track of changes in a directory environment and propagating the changes to other data depositories. Replication is a form of synchronization that is used to propagate changes from one directory server to all replicas of the same directory to ensure that each replica of a directory is, or will eventually be, identical.

There are many benefits to including replicas in a directory service. If one directory server is in heavy use, or does not have enough CPU or memory power to handle all requests, some requests can be routed to a replica to reduce the load on the first server. A local replica could be located on one side of a slow network link, and installing a replica on the other side will improve response time for users on the other side of the link. Finally, replicas could be used for failover, meaning that if one server goes down, requests can be automatically rerouted to a replica to minimize disruptions in service.

A change log is a file that maintains changes. In some embodiments of a directory service, a change log is a file maintained by a directory server to keep track of all changes to the directory. Some of the changes may have originated on the directory server. Other changes may have originated on another server and were transmitted to the directory server through a replication facility or other synchronization mechanism.

A directory has a significant advantage over other database technologies in that it includes a flexible schema structure that is separate from the "access path" to the data. In other words, the directory information tree (DIT) structure of a directory is separate from the schema. This and other data model differences allow directories to optimize certain operations for speed (e.g., search operations) and outperform other database technologies, e.g., relational database management systems, for many kinds of problems.

SUMMARY

An embodiment of a method for synchronizing changes out of a directory service comprising first and second directory servers and a sync client comprises receiving from the sync client an initial sync request, the initial sync request comprising an initial sync request parameter and an initial token, sending to the first directory server a first sync request, the first sync request comprising a first sync request parameter and a first token, sending to the second directory server a second sync request, the second sync request comprising a second sync request parameter and a second token, receiving a first response from the first directory server, wherein the first response comprises a first directory change set and a first response token, wherein the first directory change set comprises one or more changes to the dataset, receiving a second response from the second directory server, wherein the second response comprises a second directory change set and a second response token, wherein the second directory change set comprises one or more changes to the dataset, sending to the sync client the changes in the first and second directory change sets, merging the first response token and the second response token into a unified response token; and sending the unified response token to the sync client.

Also disclosed is a directory service comprising a dataset, a first directory server comprising a first directory change set, the first directory change set comprising one or more changes to the dataset, a second directory server comprising a second directory change set, the second directory change set comprising one or more changes to the dataset, a sync client, and a proxy server coupled to the first directory server, the second directory server, and the sync client, wherein the proxy server is configured to collect and send to the sync client changes in the first and second directory change sets that are new to the sync client.

Also disclosed is an alternative embodiment of a method of synchronizing changes in a directory service, comprising sending to a first directory server a first sync request, the first sync request comprising a first sync request parameter and a first token, the first sync request requesting changes to a dataset, receiving a first response from the first directory server, wherein the first response comprises a first directory change set and a first response token, wherein the first directory change set comprises one or more changes to the dataset, sending to a second directory server a second sync request, the second sync request comprising a second token, and receiving a second response from the second directory server, wherein the second response comprises a second directory change set and a second response token, wherein the second directory change set comprises one or more changes to the dataset.

Also disclosed is an alternative embodiment of a method of synchronizing changes in a directory service, comprising receiving from a sync client an initial sync request, the initial sync request comprising an initial sync request parameter and an initial token, the initial sync request requesting changes to a dataset, sending to a first directory server a first sync request, the first sync request comprising a first token, receiving a first response from the first directory server, wherein the first response comprises a first directory change set and a first response token, wherein the first directory change set comprises one or more changes to the dataset, sending to the sync client the changes in the first directory change set, and sending a sync response token to the sync client.

Also disclosed is an alternative embodiment of a method of synchronizing changes in a directory service, comprising receiving from a sync client an initial request for changes to a dataset, the initial request comprising an initial request parameter and an initial token, the initial request requesting changes that are new to the sync client, and returning a first response to the sync client, wherein the first response comprises a first directory change set and a first response token, wherein the first directory change set comprises changes that are new to the sync client.

Also disclosed is a proxy server for use in synchronizing changes to a partitioned dataset in a directory service comprising first and second directory servers and a sync client, comprising one or more processing units, memory media, and instructions which when loaded into the memory media and executed by the one or more processing units cause the proxy server to perform the steps of: receiving from the sync client an initial sync request, the initial sync request comprising an initial sync request parameter and an initial token; sending to the first directory server a first sync request, the first sync request comprising a first sync request parameter and a first token; sending to the second directory server a second sync request, the second sync request comprising a second sync request parameter and a second token; receiving a first response from the first directory server, wherein the first response comprises a first directory change set and a first response token, wherein the first directory change set comprises one or more changes to the dataset; receiving a second response from the second directory server, wherein the second response comprises a second directory change set and a second response token, wherein the second directory change set comprises one or more changes to the dataset; sending to the sync client the changes in the first and second directory change sets that are new to the sync client; merging the first response token and the second response token into a unified response token; and sending the unified response token to the sync client.

Also disclosed is a directory server for use in synchronizing changes in a directory service, comprising one or more processing units, memory media, and instructions which when loaded into memory media and executed by the one or more processing units cause the directory server to perform the steps of: receiving from a sync client an initial request for changes to a dataset, the initial request comprising an initial token, the initial request requesting changes that are new to the sync client, and returning a first response to the sync client, wherein the first response comprises a first directory change set and a first response token, wherein the first directory change set comprises changes that are new to the sync client.

DESCRIPTION OF THE DRAWINGS

FIGS. 4A, 4B are an exemplary sync request and token.

FIGS. 5A, 5B are an exemplary sync request and token.

FIGS. 6A, 6B are an exemplary sync request and token.

FIGS. 7, 8 and 9 are exemplary tokens.

FIGS. 10A and 10B are an exemplary sync request and token.

FIG. 11A is an exemplary sync request.

FIGS. 11B, 11C, 11D, and 11E are exemplary tokens.

FIGS. 12A, 12B are an exemplary sync request and token.

FIGS. 13, 14, and 15 are exemplary tokens.

FIGS. 16A, 16B are an exemplary sync request and token.

FIGS. 17A, 17B are an exemplary sync request and token.

FIGS. 18A, 18B are an exemplary sync request and token.

FIGS. 19, 20 and 21 are exemplary tokens.

FIGS. 22A, 22B are exemplary change logs.

FIG. 25 depicts an exemplary synchronization request.

FIGS. 26A and 26B depict exemplary token data.

FIGS. 27A and 27B depict exemplary token data.

FIG. 28 depicts an exemplary response to a synchronization request.

FIG. 30A depicts an exemplary intermediate response to a synchronization request.

FIGS. 30B, 30C, 30D, 30E, 30F, and 30G are exemplary responses to a synchronization request and tokens.

FIGS. 30H, 30I, 30J, 30K, and 30L depict the contents of exemplary tokens.

FIG. 31 depicts an exemplary token in an alternative embodiment.

FIGS. 32-39 depict exemplary tokens in an alternative embodiment.

DETAILED DESCRIPTION

Figure 1:
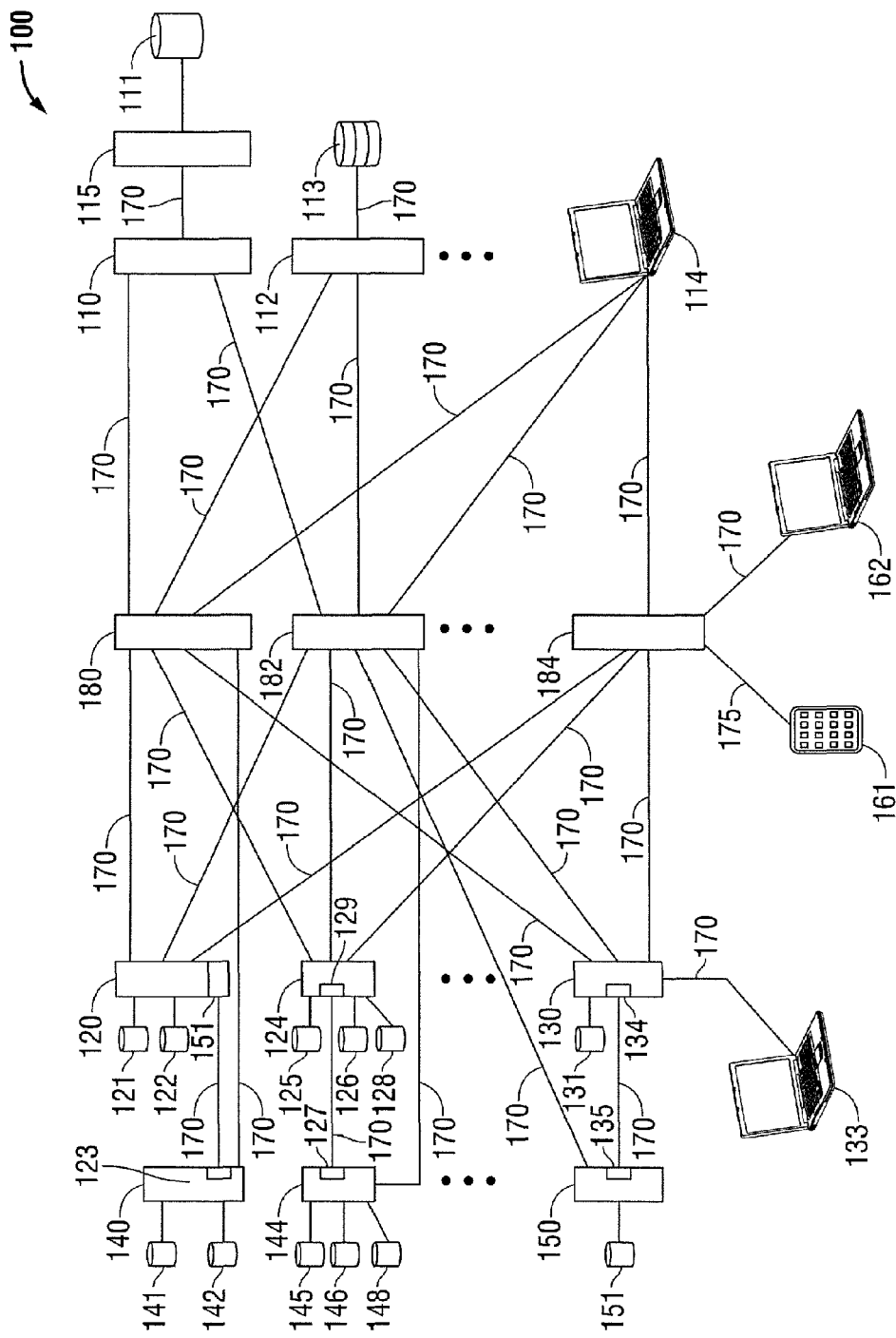
FIG. 1 is a top level block diagram of an exemplary embodiment of a directory service.

Embodiments of the methods, systems and servers described herein provide for synchronization of changes in a directory service. FIG. 1 depicts an exemplary directory service 100 comprising directory servers 120, 124, 130, 140, 144, and 150, synchronization servers (or sync servers) 110, 112, third-party sync client 114, and proxy servers 180, 182, 184. Preferably, directory service 100 is an LDAP version 3 directory.

A directory server can be selectively configured to host one or more LDAP directories. A directory may comprise one or more datasets. A dataset is a generic term that means a collection of logically related entries without regard to location. In the context of a directory service, the base DN is a way to bind the dataset into the DIT structure. Each dataset may be independent of the other datasets, or a dataset may be related to one or more other datasets. For example, one dataset may contain a sub-tree of another dataset. In an embodiment, a plurality of datasets may be combined into a single logical dataset that is exposed to a sync client as a single LDAP directory. For example, as discussed below, in an embodiment a proxy server may be used to maintain one or more datasets stored on separate directory servers as separate partitions of a single logical dataset. In the exemplary directory service 100, directory server 120 hosts datasets 121 and 122, directory server 124 hosts datasets 125, 126 and 128, and directory server 130 hosts dataset 131.

Directory service 100 includes one or more means of accessing directories to read or update the directory, including, as depicted in FIG. 1, an external LDAP client hosted on computer 133 and connected to directory server 130 via link 170, a mobile application 161 connected to proxy server 184 via link 175, and an external LDAP client hosted on computer 162 and connected to proxy server 184 via link 170, and a third party sync client 114. Preferably, a user or application can access a dataset in directory service 100 via any proxy server. In embodiments not shown, a proxy server will have connections to all directory servers in a topology.

A dataset may be replicated. In an embodiment, replication of a dataset means maintaining, in an eventually consistent way, one or more exact copies (or replicas) of the dataset including, in embodiments, the same Directory Information Tree (DIT) structure, entries and attributes. A dataset preferably is replicated on a different directory server. In exemplary directory service 100, datasets 141 and 142, hosted on directory server 140, are duplicates of datasets 121 and 122, respectively, hosted on directory server 120; and datasets 145, 146 and 148, hosted on directory server 144, are duplicates of datasets 125, 126 and 128, respectively, hosted on directory server 124; and dataset 151, hosted on directory server 150, is a duplicate of dataset 131 hosted on directory server 130. Alternative embodiments may include multiple replicas for any dataset.

Preferably a replication facility is provided in each directory server. Embodiments of a replication facility include native replication ability in a directory server, a replication server co-resident in a directory server, an external replication facility, and other means known to those of ordinary skill in the art that enable directory servers to exchange details of changes via a communications protocol such as TCP/IP or another communications protocol available to one of skill in the art. The scope of the invention is not limited by the type of facility that is used to enable replication. In an embodiment, directory server 120 includes replication facility 151 which communicates with replication facility 123 in replica directory server 140; directory server 124 includes replication facility 129 which communicates with replication facility 127 in replica directory server 144; and directory server 130 includes replication facility 134 which communicates with replication facility 135 in replica directory server 150.

It is possible that at an instant in time, two replicated directories, for example, 131 and 151, will not be exact replicas of each other. For example, if a change has been made to dataset 131 on directory server 130 via an external LDAP client hosted on client computer 133, there will be a time delay until that same change is propagated via replication facilities 134 and 135 to directory server 150 and applied to dataset 151. Preferably, however, the time delay is slight and, for practical purposes, any user seeking to access directory server 130 or 150 can assume that the two directories are automatically and autonomously maintained as exact duplicates by the replication facilities.

In an embodiment, a sync server synchronizes the contents of a directory with another directory or another data repository, such as a relational data base management system (RDBMS). Synchronization includes making queries to detect changes to a sync source, e.g., a dataset hosted on a directory server, and based on the response, propagating the changes to a sync destination, e.g., a RDBMS. In embodiments a sync server does not communicate directly with a user or application but operates "behind the scenes" to keep other resources, such as relational databases, in sync with the source repository. In exemplary directory service 100, sync server 110 synchronizes the directories with a directory server 115 hosting dataset 111, sync server 112 synchronizes the directories with external RDBMS 113, and external LDAP client 114 is hosted on an external computer. Sync servers 110, 112 and 114 can each act as a sync client and a sync source. A sync server can be hosted on a separate standalone server computer, it can be a separate stand-alone process on a directory server or a proxy server, or it can be operated by a directory server process. A sync server in an embodiment is interconnected to at least one proxy server. In alternative embodiments a sync server is interconnected directly to a directory server.

The components of directory service 100 are interconnected by links 170. Link 170 includes any means of interconnecting computers known to those of skill in the art, including, by way of example, ethernet and other local area network (LAN) communications networks, the internet, World Wide Web, and other wide area network (WAN) communications networks. The communications protocol may include TCP/IP or any other communications protocol. In addition, mobile applications may interconnect to directory service 100 via communications link 175, which includes any form of interconnection included in links 170 and all forms of wireless or telecommunications networks. The scope of the invention is not limited by the nature of the network or by the means of interconnection between the various components of the directory service.

For purposes of illustration, exemplary directory service 100 is illustrated with six directory servers, three proxy servers, and three sync servers. However, the scope of the invention is not limited by the number of components nor is it limited to any specific topology.

In directory service 100, proxy servers 180, 182 and 184 act as intermediaries between directory servers 120, 124, 130, 140, 144, 150 and sync servers 110, 112 and 114 and external LDAP clients. In an embodiment, each proxy server can be interconnected via link 170 with one, some or all of the directory servers in directory service 100. In alternative embodiments, changes to a dataset may be exposed by a proxy server directly connected to a user or application without a sync server.

In computer networks, a proxy server is a server (a computer system or an application) that acts as an intermediary for requests from clients seeking resources from other servers. A client connects to the proxy server, requesting some service, such as a file, connection, web page, or other resource, available from a different server. The proxy server evaluates the request according to its filtering rules. For example, it may filter traffic by IP address or protocol. If the request is validated by the filter, the proxy provides the resource by connecting to the relevant server and requesting the service on behalf of the client. A proxy may optionally alter the client's request or the server's response. Proxy servers 180, 182, and 184 preferably perform load balancing, fail over, and data transformation.

Load balancing refers to algorithms used to decide which directory server should respond to a client request. Embodiments of load balancing algorithms include: single server (in which the user determines which server is to respond to specific requests, or types of requests), fewest operations (in which the proxy server routes requests to the directory server that has the fewest outstanding operations originating from that proxy server), round robin (in which requests are spread evenly across all back-end servers in a round robin fashion), weighted (in which requests are routed to back-end servers in accordance with a pre-configured weighting metric, such that servers with a higher weight receive a correspondingly higher percentage of client requests than servers with a lower weight), health-weighted (in which a health score, for example, available, degraded or unavailable, is maintained for each directory server and back-end servers with a higher health score will receive a correspondingly higher percentage of client requests than servers with a lower health score), failover (in which all requests will be consistently forwarded to the same back-end server as long as it remains available, at which point requests are forwarded to an alternative server, preferably in a pre-configured ordering), geographic proximity (in which requests are forwarded to a server that is geographically closer), and client affinity (in which requests are forwarded to servers that satisfy a predetermined affinity measure). Embodiments may use one or more of these load balancing algorithms simultaneously.

Data transformation refers to processes for transforming or translating client requests before the requests are routed to a back-end directory server, and transforming or translating a directory server response before the response is returned to the client. Exemplary types of data transformation in embodiments include the following: attribute mapping (in which the proxy server transparently renames any attributes referenced in requests from clients and in responses from the server back to those clients), DN mapping (in which the proxy server transparently alters any DNs referenced in requests from clients and in responses from the servers back to these clients), default values (in which the proxy server can automatically insert a specified set of values for a target attribute in add requests before they are sent to the back-end servers, or in search result entries before they are returned to clients), attribute suppression (in which the proxy server can be configured to prevent clients from accessing a specified attribute), and entry suppression filters (in which the proxy server can be configured to prevent entries that match a specified filter from being returned to clients).

The proxy server preferably can be configured to partition a dataset. One form of partitioning, in an embodiment is referred to as "entry-balancing" and includes spreading entries below a common parent across two or more different directory servers. In embodiments the directory servers are replicated and entries in the partitioned dataset may be distributed over two or more sets of replicated directory servers. Entry balancing can be used to efficiently support a large dataset by spreading the dataset across smaller servers as opposed to more expensive large-scale server computers. The proxy server, in an embodiment, keeps track of which dataset each entry is assigned to and conceals this complexity from clients.

In another embodiment of partitioning a dataset, a proxy server can logically unify disparate datasets so that clients of the proxy can request data in either set, and the proxy determines which back-end directory to access. Data transformation provides the ability to convert the data in one of the sets to align with the data in the other one. The main transformation is to rename attributes, but others are possible including splitting the value of an attribute into multiple separate attributes or vice versa. For example, an address attribute can be split into separate street-address, city, state, zip. An exemplary embodiment of this approach might arise after a corporate merger, where each of the formerly independent companies used materially different datasets, and a proxy server uses data transformation to present the two disparate datasets as a single dataset.

Figure 3A:
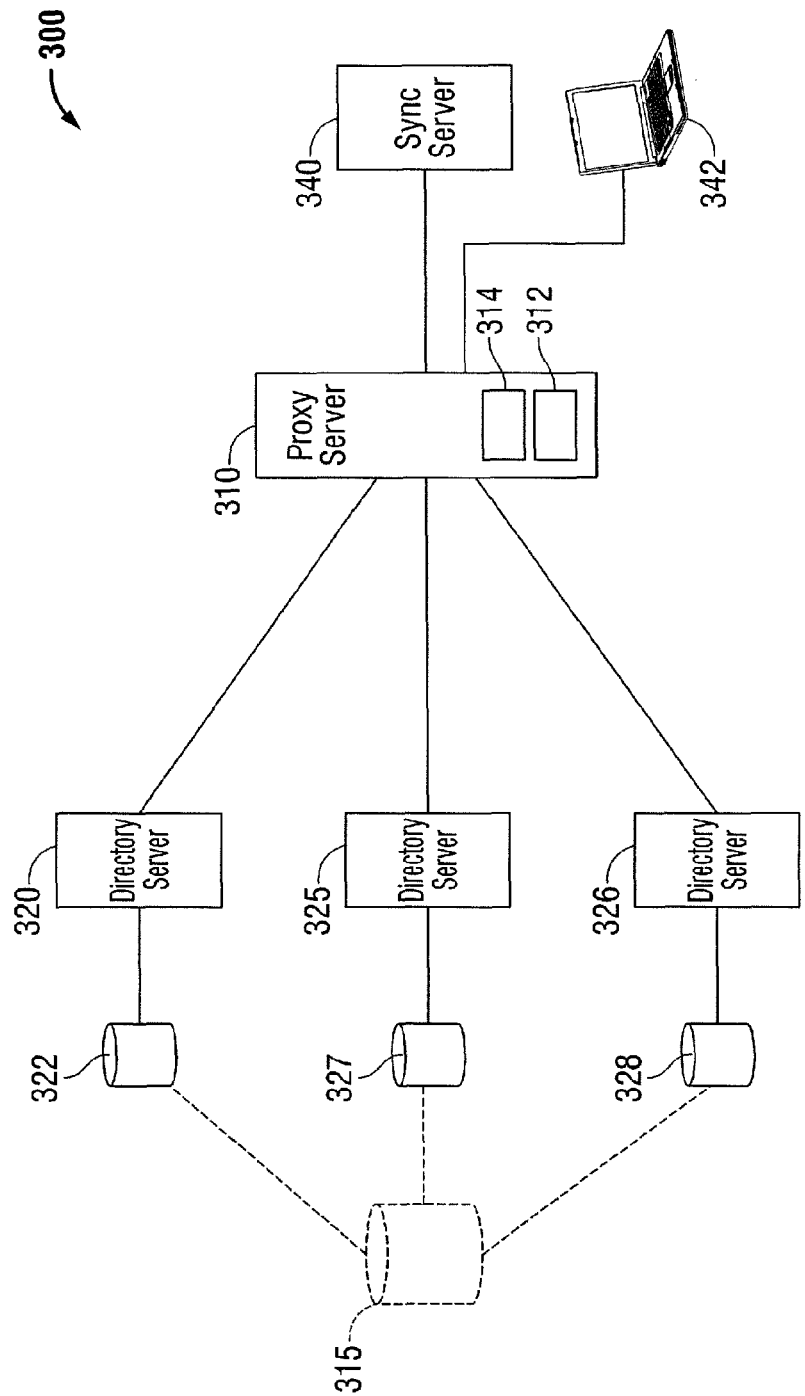
FIGS. 3A and 3B are top level block diagrams of exemplary embodiments of a partitioned directory service.

FIG. 3A depicts an exemplary directory service 300 comprising a proxy server 310, sync server 340, external LDAP client 342, and directory servers 320, 325 and 326, with a logical dataset 315 partitioned into three separate datasets 322, 327, and 328.

Figure 24A:
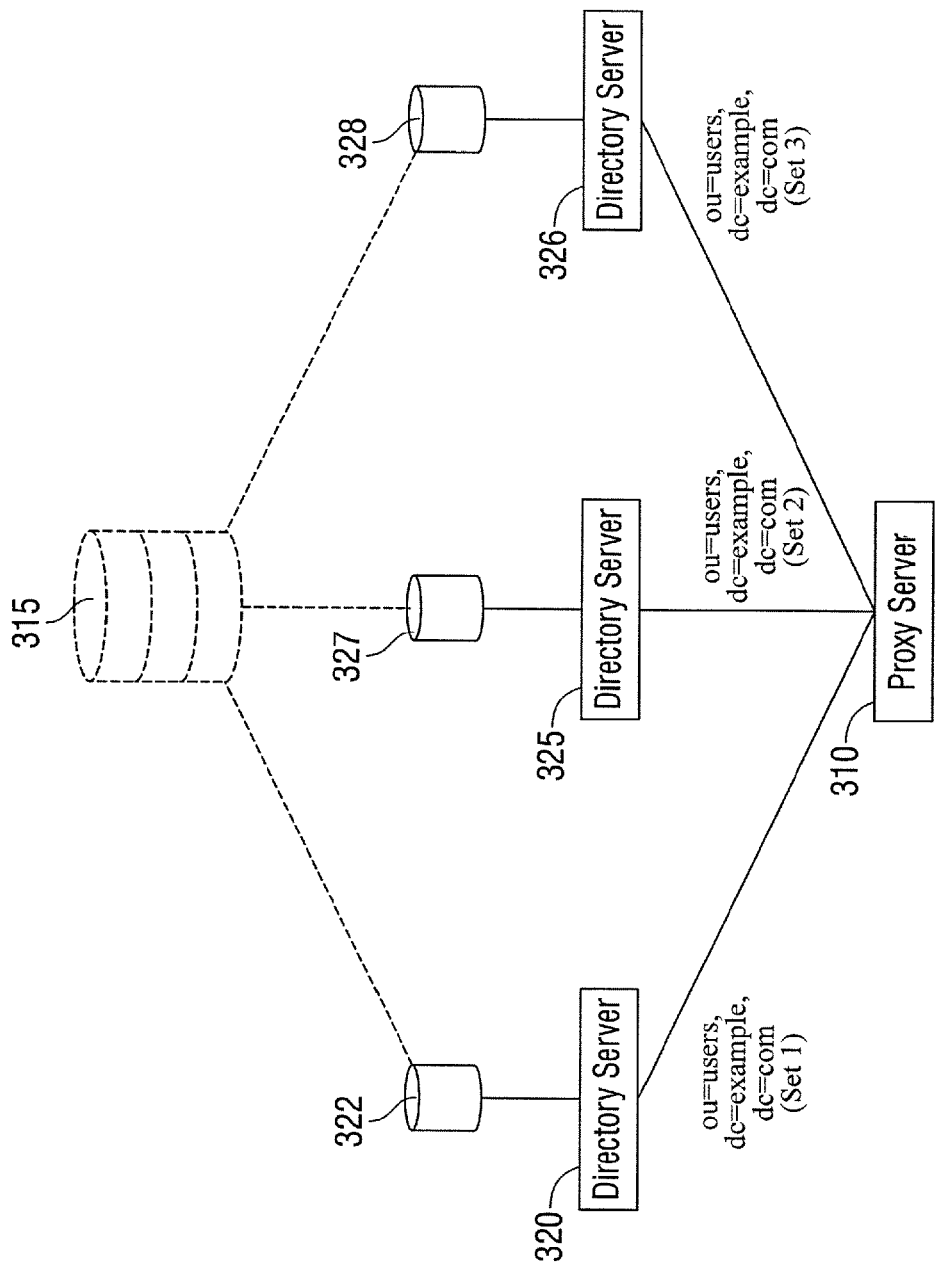
FIGS. 24A, 24B are top level diagrams of exemplary embodiments of a partitioned directory service.

Logical dataset 315 in an embodiment is partitioned using entry balancing. In an exemplary embodiment, the logical dataset 315 for LDAP directory ou=users, dc=example, dc=com is too large to be efficiently served by a single directory server. FIG. 24A depicts an exemplary partitioning of logical dataset 315 in which datasets 322, 327 and 328 each store a different partition of logical dataset 315. Preferably each different partition stores a disjoint subset of the entries of logical dataset 315. In the exemplary directory service depicted in FIG. 24A, each of the directory servers 320, 325, 326 is configured to host a dataset with base DN ou=users, dc=example, dc=com (namely, datasets 322, 327 and 328). In an embodiment, proxy server 310 supports the partitioning. By keeping track of which partition stores each entry in the directory and routing each request to the directory server storing the appropriate partition, proxy server 310 exposes to a sync client a single LDAP directory distributed over three physical directory servers. For discussion purposes, the different partitions of logical dataset 315 stored on datasets 322, 327, 328 are identified as Set 1, Set 2 and Set 3.

Proxy server 310 preferably employs one or more placement algorithms to assign each entry in logical dataset 315 to one of the datasets 322, 327 and 328. In an embodiment, the selection of placement algorithms is a configuration option. Exemplary placement algorithms include random assignment, round robin, most free space, hashed DN, same server set, and user-configurable algorithm. In an embodiment of a random assignment algorithm, proxy server 310 randomly assigns each entry to in logical dataset 315 to one of datasets 322, 327 and 328. In another embodiment of a placement algorithm, proxy server 310 assigns each entry in dataset 315 to whichever of the datasets 322, 327 and 328 has the most available space, either fewest entries or the smallest overall storage footprint of the dataset. In a round robin algorithm, proxy server 310 imposes a cyclical ordering sequence on directory servers 320, 325 and 326 and assigns each entry to the next directory in the sequence. In a hashed DN algorithm, proxy server 310 hashes the DN of the entry and assigns the entry to one of directory servers 320, 325, or 326 through a pre-determined mapping of hash values to directory servers. This type of hashed DN algorithm guarantees that an entry with the same DN will always be added to the same dataset, which is advantageous in situations where the same entry might be added through multiple proxies at the same time. In a same server set algorithm, proxy server 310 adds entries to one server set, e.g., dataset 322 on directory server 320, until the dataset reaches a predetermined capacity level, and then subsequent entries are added to a different server set, e.g., dataset 327 on directory server 325, until dataset 327 reaches a predetermined capacity level. Finally, in an embodiment proxy server 310 includes an extension point where users can install their own encoded placement algorithm.

In an embodiment, proxy server 310 maintains a persistent mapping 314 between each different partition and its corresponding logical dataset. For example, proxy server 310 in an embodiment may refer to the partition on dataset 322 as dc=users, dc=example, dc=com (set 1), the partition in dataset 327 as dc=users, dc=example, dc=com (set 2), and the partition in dataset 328 as dc=users, dc=example, dc=com Set 3. Preferably persistent mapping 314 is maintained in memory and in another form of persistent storage, preferably a disk drive or non-volatile memory (not illustrated). In a topology with multiple proxy servers, each proxy server preferably maintains an identical copy of persistent mapping 314. As described below, proxy server 210 preferably uses these names and mapping in the proxy tokens.

Proxy server 310 preferably maintains an index 312 of the mapping of each entry in dataset 315 to its respective server. Index 312 is preferably maintained in memory. In a topology with multiple proxy servers, each proxy server preferably maintains an identical copy of index 312. In an embodiment, index 312 contains a key to each entry in dataset 315. Preferably the key comprises the DN of the entry, since that is the key that is used to modify entries, and one or more additional user-defined keys. For example, if an application is configured to search on another attribute such as an email address or a phone number, those keys preferably are also stored in index 312. When external LDAP client 342 or sync server 340 sends a client request to a specific entry in dataset 315, proxy server 310 determines from index 312 which directory server stores that particular entry, submits the client request directly to that server, and then passes the response to the requester.

Thus proxy server 310 exposes a single LDAP dataset to the client, i.e., sync server 340 or external LDAP client 342. From the client's perspective, it is dealing with proxy server 310 as if proxy server 310 were a single directory server for the entire dataset ou=users, dc=example, dc=com, and the actual mapping between dataset entries and back-end directory servers is invisible to the client.

Figure 24B:
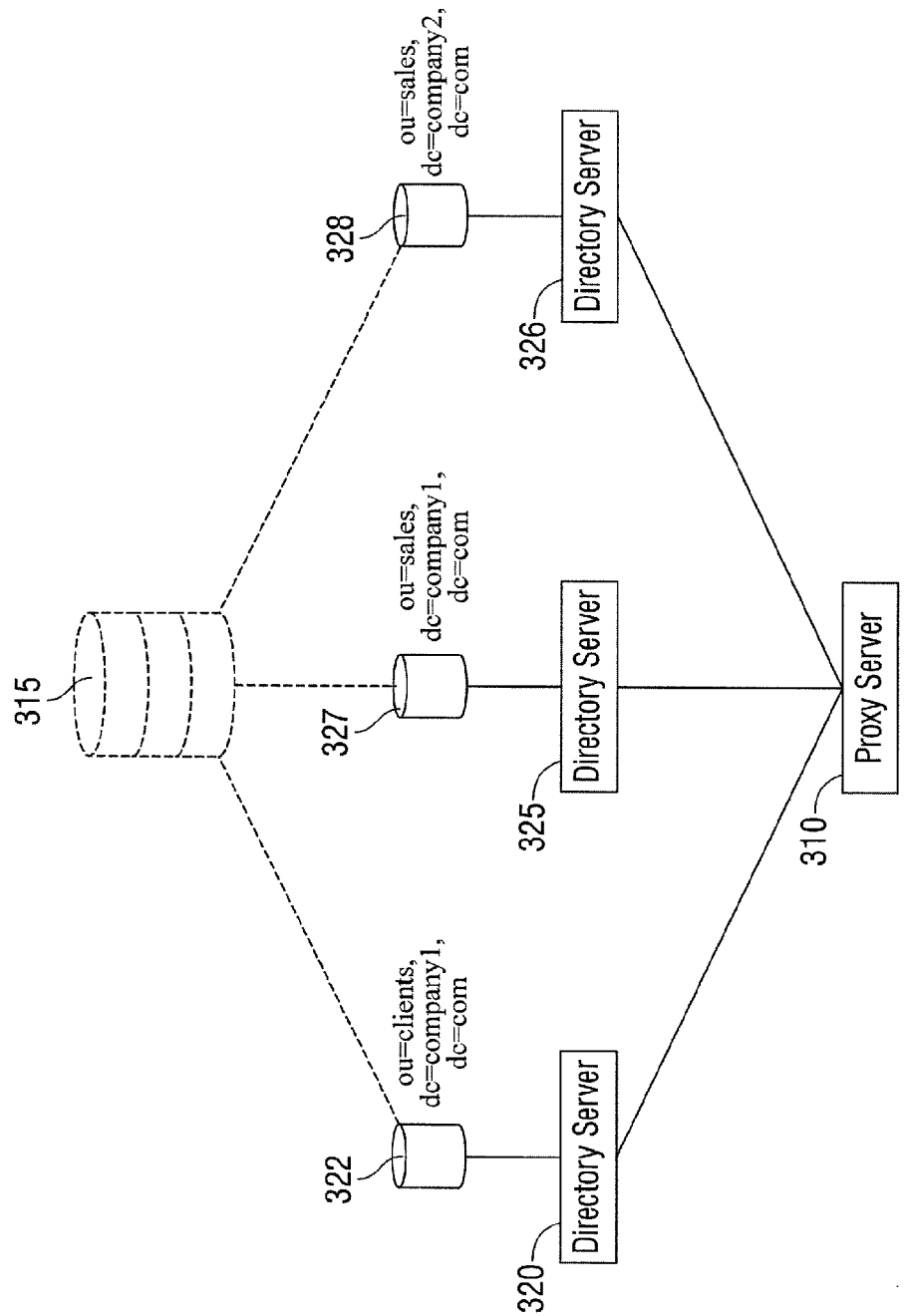

In another embodiment of a partitioned dataset depicted in FIG. 3A, the logical dataset 315 comprises two or more independent and distinct datasets. In an exemplary embodiment illustrated in FIG. 24B, proxy server 310 provides access to dataset 315, which is comprised of three distinct datasets. Directory server 320 stores dataset 322 containing the data with base DN ou=clients, dc=company 1, dc=com. Directory server 325 stores dataset 327 containing the data with base DN ou=sales, dc=company 1, dc=com. Directory server 326 stores dataset 328 containing the data with base DN ou=sales, dc=company2, dc=com. In this exemplary embodiment proxy server 310 maintains the logic to route requests to the correct dataset and to transform and translate requests and responses to accommodate the different naming and information models of the three different partitions. For example, the proxy server would expose each individual base DN to a sync client, but it would also receive queries at dc=company 1, dc=com and route those queries to directory server 320, for queries with RDN ou=clients, or to directory server 325, for queries with RDN ou=sales. Likewise, a query based at dc=com would go to all three servers. In an alternative embodiment, not illustrated, proxy server 310 can provide simultaneous support for multiple types of partitioning. For example, datasets 322 and 327 could be different subsets of a single partitioned large dataset, for example, a dataset with base DN ou=users, dc=company 1, dc=com, and dataset 328 could include a different dataset with base DN dc=company2, dc=com.

Preferably each directory server 320, 325, and 326 in FIG. 3A is replicated with other directory servers (not shown) to make their datasets highly available. Thus the portion of dataset 315 housed on directory server 320 is independently replicated from the portions of dataset 315 that are housed on directory servers 325, 326.

Figure 3B:
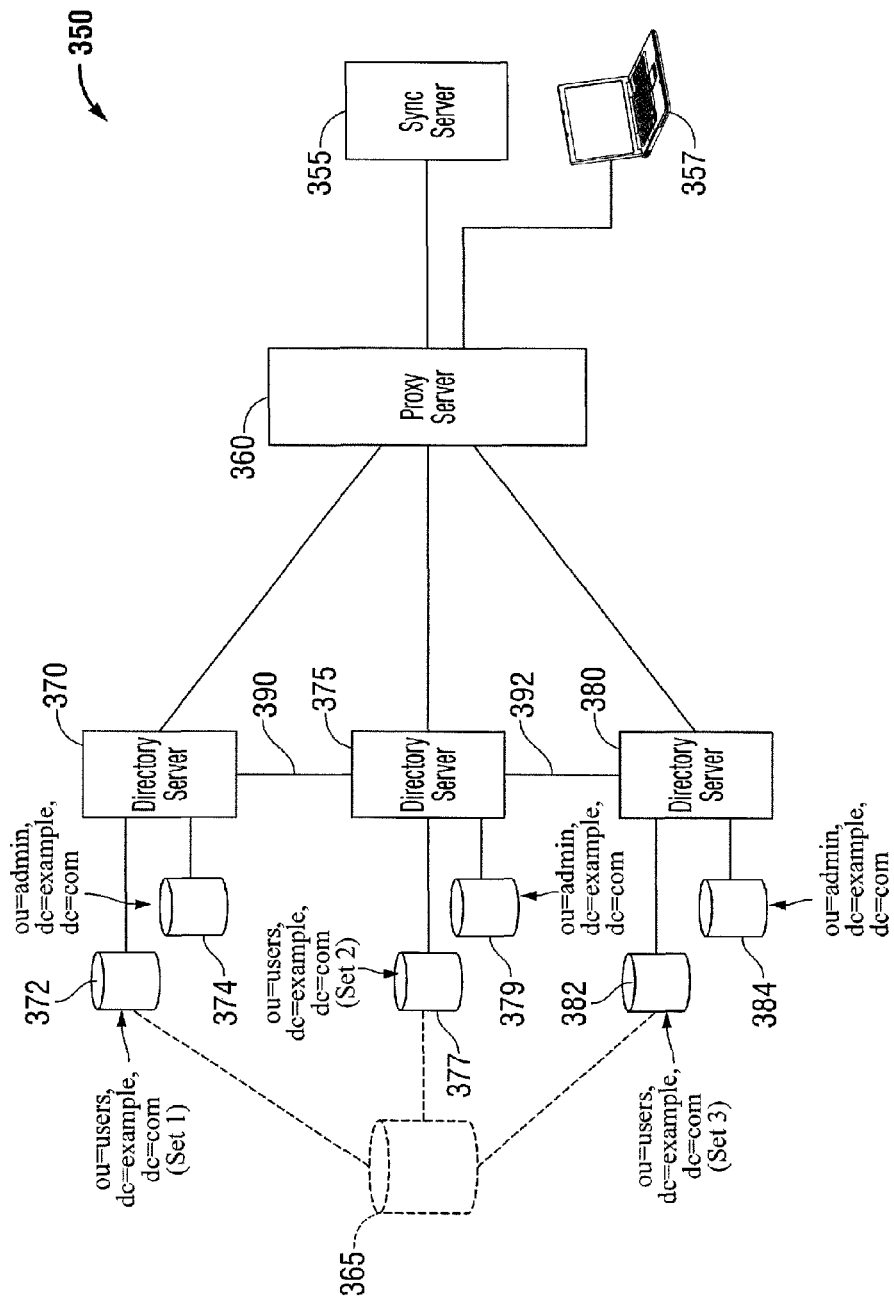

FIG. 3B depicts an alternative embodiment of a partitioned dataset. Partitioned directory service 350, in FIG. 3B, comprises sync server 355, external LDAP client 357, proxy server 360, directory server 370 hosting datasets 372, 374, directory server 375 hosting datasets 377, 379, and directory server 380 hosting datasets 382, 384. For illustration purposes, logical dataset 365 is partitioned using entry-balancing, and datasets 372, 377 and 382 each contain a different portion of logical dataset 365 with the same LDAP base, e.g., ou=users, dc=example, dc=com. Datasets 374, 379, and 384, in directory service 350, each contain a replicated copy of a global dataset, meaning a dataset that is not partitioned and is present on all replicas. The DN of the global dataset (ou=admin, dc=example, dc=com) is different from the base DN of the partitioned dataset (ou=users, dc=example, dc=com). Replication facilities 390 and 392 are used to maintain datasets 374, 379 and 384 as exact replicas of each other.

Figure 2:
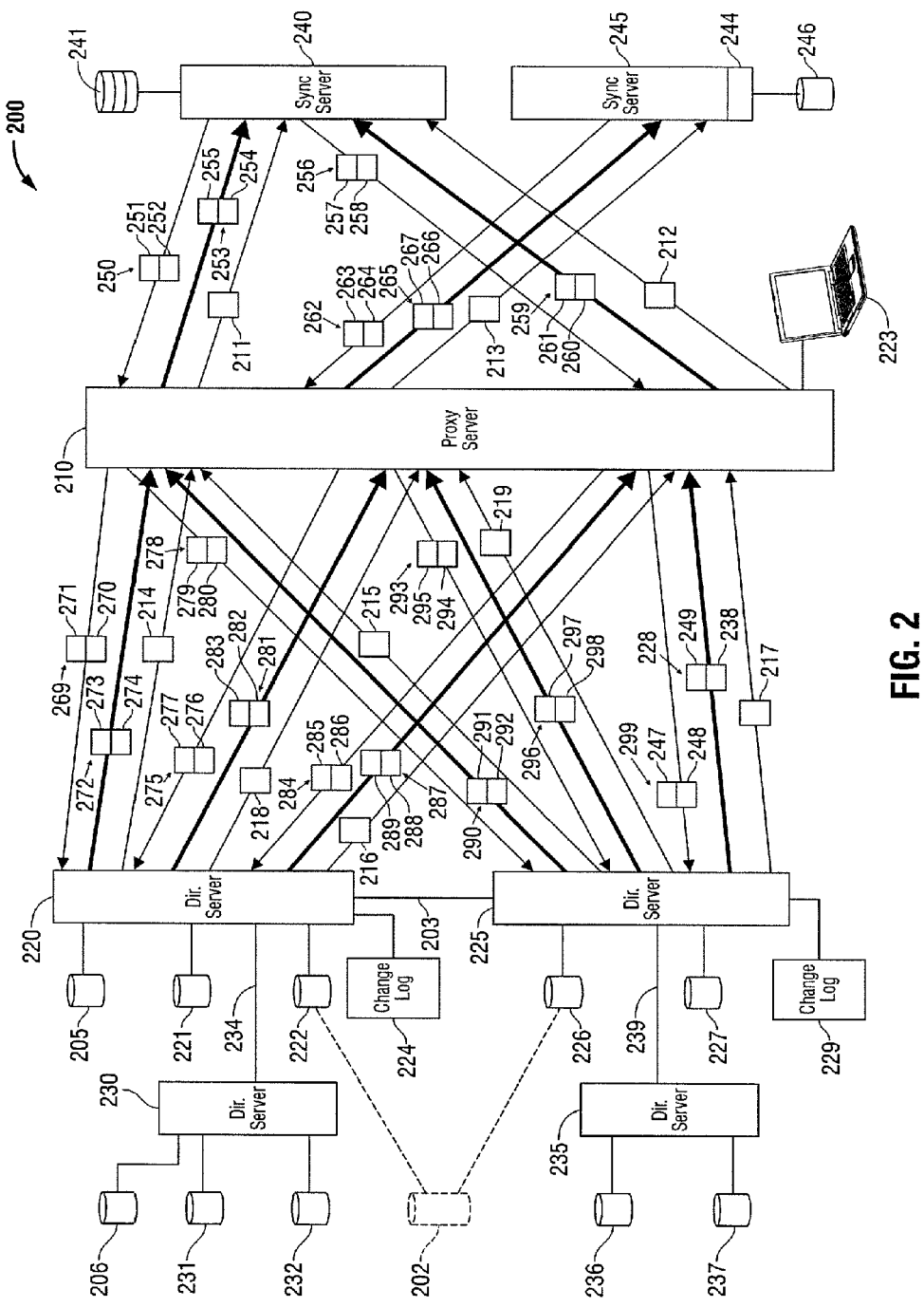
FIG. 2 is a data flow diagram of an exemplary sequence of synchronization requests and responses.

FIG. 2 illustrates an exemplary sequence of events involved in synchronization of a partitioned dataset in an exemplary directory service 200. Directory service 200 comprises proxy server 210, directory servers 220, 225, 230, 235, sync servers 240, 245, and external LDAP client 223. Sync server 240 handles synchronization with external RDBMS 241. In the embodiment shown in FIG. 2, sync server 245 and directory server 244 are independent processes that run on the same computer server system. In an alternative embodiment (not illustrated), sync server 245 is hosted on one physical computer server system and linked via a link 170 to a directory server 244 on a different physical computer server system.

The exemplary directory service 200 stores three distinct base DNs: ou=users, dc=example, dc=com; ou=admin, dc=example, dc=com; and ou=sales, dc=example, dc=com. Each of the unique datasets that stores data within one of these base DNs has a unique identifier, a replica ID. A replicaID preferably is associated with the dataset, and one directory server could have multiple replicaIDs, one for each dataset stored on the directory server.

OU=users. Dataset 202 with base DN ou=users, dc=example, dc=com is partitioned into two partitions by entry balancing. The two partitions of dataset 202 are identified here as ou=users, dc=example, dc=com (Set 1) and ou=users, dc=example, dc=com (Set 2). Dataset 222 and its replica 232 each hold the Set 1 partition; and dataset 226 and its replica 236 each hold the Set 2 partition. Dataset 222 is physically stored on directory server 220, and replica dataset 232 is physically stored on directory server 230.

Dataset 226 is physically stored on directory server 225, and replica dataset 236 is physically stored on directory server 235.

OU=admin. The datasets with base DN ou=admin, dc=example, dc=com have replica IDs 221, 227, 231, 237. Dataset 221 is physically stored on directory server 220, and replica dataset 231 is physically stored on directory server 230. Dataset 227 is physically stored on directory server 225, and replica dataset 237 is physically stored on directory server 235.

OU=sales. The datasets with base DN ou=sales, dc=example, dc=com have replica IDs 205 and 206. Dataset 205 is physically stored on directory server 220, and replica dataset 206 is physically stored on directory server 230.

Replication facility 203, between directory servers 225 and 225, replicates datasets 221 and 227. Replication facility 234, between directory servers 220 and 230, replicates datasets 205, 206, 221, 231, 222, 232. Replication facility 239, between directory servers 225 and 235, replicates datasets 226, 236, 227, and 237. Directory service 200 also includes, preferably, replication facilities between directory servers 230 and 235, 220 and 235, and 225 and 230 (not shown).

Table 1 below illustrates the mapping between LDAP directories (identified by base DN), directory servers and datasets.

TABLE 1

| Directory Data | Directory Server/Replica ID | | | |
| --- | --- | --- | --- | --- |
| | Directory Server 220 | Directory Server 230 | Directory Server 225 | Directory Server 235 |
| ou = sales, dc = example, dc = com | Replica ID 205 | Replica ID 206 | — | — |
| ou = admins, dc = example, dc = com | Replica ID 221 | Replica ID 231 | Replica ID 227 | Replica ID 237 |
| ou = users, dc = example, dc = com (set 1) | Replica ID 222 | Replica ID 232 | — | — |
| ou = users, dc = example, dc = com (set 2) | — | — | Replica ID 226 | Replica ID 236 |

In an embodiment, proxy server 210 stores the mappings in Table 1 in persistent mapping 314. Persistent mapping 314 enables proxy server 210 to freely translate between replica IDs, CSNs, and base DNs.

Directory server 220 maintains exemplary change log 224, and directory server 225 maintains exemplary change log 229. Change logs 224 and 229 preferably are LDAP datasets that contain changes to datasets hosted by a directory server. Exemplary change log 224, depicted in FIG. 22A, includes all changes in an exemplary time interval to datasets hosted by directory server 220, and exemplary change log 229, depicted in FIG. 22B, shows all changes in an exemplary time interval to the datasets hosted by directory server 225. In an embodiment, the change log for a directory may be accessed through an LDAP request on the attribute cn=changelog. An exemplary specification for a change log can be found in http://tools.ietf.org/html/draft-good-ldap-changelog-00, incorporated herein by reference.

For each change to a dataset hosted by directory server 220, preferably there is a corresponding change log entry in exemplary change log 224 that includes, in an embodiment, a change log number, a Change Sequence Number (CSN), and the actual contents of the change (change contents). The change log number preferably is a sequential ordering sequence unique to directory server 220. The Change Sequence Number (CSN) comprises, in an embodiment, a time stamp, a replica ID, and a sequence number. The replica ID identifies the specific dataset where the change was first made, and the time stamp identifies the time instant at the replica ID when the change was made.

In an embodiment, the change log will include both changes that came in directly from a client to a dataset hosted on the server as well as changes that were originally made at a different server and then were applied to the local server as part of replication. For example, change log 224 for directory server 220 may include changes at datasets 205, 221, and 222 (i.e., the datasets directly hosted by directory server 220) as well as changes that originated at replicas of datasets 205, 221, or 222 hosted on other servers (i.e., datasets 206, 231, 232, 227, 237) and that were propagated to directory server 220 by replication facility 234 (for datasets 206, 231 and 232) or 203 (for datasets 227, 237).

In an embodiment, the sequence number is a sequential ordering of all changes that occur within the same time instant on the local server. In an alternative embodiment, the sequence number is a sequential ordering of all changes that occur within another time interval on the directory server (such as, for example, since the last time the server was launched.)

In an embodiment, each CSN is unique over the entire directory service, and there is a one-to-one relationship between a change to the directory and a specific CSN and each CSN uniquely identifies a single change to a directory. Further, the CSN provides a temporal ordering of all changes to a replica ID. Consider, for example, two CSNs for the same replica ID R with times T and sequence numbers S: $CSN_a=(T_a, R, S_a)$ and $CSN_b=(T_b, R, S_b)$. If $T_a<T_b$, then $CSN_a$ is the earlier change. If $T_a=T_b$ and $S_a>S_b$, i.e., the changes were made during the same time instant but $CSN_b$ has an earlier sequence number, $CSN_b$ refers to the earlier change. In exemplary change log 229 (FIG. 22B), for example, change log entry 2283 with CSN {226; 10:04:12; 1001} precedes change log entry 2284, with CSN {226; 10:04:12; 1002}. Preferably the CSN is encoded in a string representation that places the time stamp first, then the replicaID, then the sequence number; and this encoding enforces a lexicographical ordering of the string representations of CSNs so that the encoded value of the CSN {226; 10:04:12; 1001} will have a lower score or number than the encoded value of the CSN {226; 10:04:12; 1002}.

Referring to the depiction of exemplary change log 224 in FIG. 22A, exemplary change log entry 2205 has change log number 5034 and CSN {222; 10:02:01; 1001}. CSN {222; 10:02:01; 1001} identifies the change made at time 10:02:01, sequence no. 1001, at replica ID 222.

The change contents in a change log entry preferably may contain any type of change permitted under the LDAP protocol and extensions thereof. The exemplary change contents of change log entry 2205 is a change to the entry for user id (uid) user3 in the ou=users, dc=example, dc=com dataset that changes the state (st) attribute to TX. Expressed in LDAP format, the change contents for change log entry 2205 are:

targetdn: uid=user3, ou=users, dc=example, dc=com
changetype: modify
replace: st
st: TX The synchronization sequence preferably includes sync requests and sync responses. A sync request is the mechanism by which a sync client obtains new changes to the directory. In an embodiment, a sync client may be another directory server connected in the same directory service or a different directory service. A sync client may be a sync server that is connected to another data depository, for example, an RDBMS. In embodiments, a proxy server can act a sync client with respect to a directory server. An application with an LDAP interface also can be a sync client. In an embodiment of a directory service that includes a proxy server, the proxy server preferably is exposed to the sync client as a specified directory server, so a sync request sent to a specified directory server will be intercepted and handled by the proxy server, which will receive and respond to the sync request in the same manner as the specified directory server.

In conventional embodiments of a directory service, a sync client can request, and a directory server will return, all changes in the change log, or perhaps all changes beginning with a specific change log number. Such changes may be weeks old if the directory has not been recently updated and may include old changes that the sync client has already seen. This type of approach has several disadvantages. This type of approach cannot be used to filter changes based on a specific DN or changes that involve specific attributes. A sync client that is interested only changes to specific DNs or specific LDAP operations must handle all the details of sifting through the entire batch of changes to cull out the changes in which it is interested and must provide the logic and resources to do so within the performance requirements of the system.

A significant advantage of directories over other database technologies is that directories provide multi-master replication with eventual consistency semantics. This means that multiple directories can be updated concurrently, and a replication protocol ensures that all servers converge to the same view of the data. This provides clients with a high level of service availability because, when all servers end up with the same data, the data remains accessible even when individual servers become unavailable. Unfortunately since individual changes are applied to servers in a different order, data consistency across servers does not extend to a conventional LDAP-accessible change logs. Changes will naturally be applied in a different order at different servers, so the ordering in the change log will not be consistent between systems, and the change log numbering of the servers might differ widely.

If a directory includes enough meta data in change log entries, a client may be able to use knowledge of the directory topology to provide for "failover" from one directory's change log to another. There are drawbacks to this approach. 1) The client would have to keep track of information about each server in the topology. 2) Failing over to an alternate server to read the change log would be inefficient since the client would have to process many changes that it has already seen; in some situations the entire change log must be read to be sure that no change was overlooked. 3) Clients would be required to communicate directly with the directory servers and would not be able to use a directory proxy server. Although a directory proxy server may be used in some cases to provide failover and load-balancing functionality to clients, this only works for data that is consistent across the directory server replicas. So even if a directory server provided enough meta data in change log entries to failover, retrieving changes through a directory proxy server would not be possible.

A directory proxy server can be used to unify into a single view distinct partitions of directory data stored in separate replicated topologies. Thus a client could query a single proxy server for data that is stored in separate directory servers without knowledge of which directory servers store which data. However, this facility is not extended to retrieving change log data in a conventional LDAP implementation. Clients must 1) be aware of which directory servers store which data, 2) store change log information about each directory server for each dataset, and 3) issue separate queries for change log data for each dataset. As the number of servers and replica servers increases, this task quickly become unmanageably complex. The necessity of keeping track of the current state of the change log for each individual server in a directory service impedes scalability because there is a point when the topology of the directory service becomes so complex that the sync client cannot in real time track the current state of the change log for each server in the system.

In embodiments of the invention, a sync request can be used to obtain changes new to the sync client, meaning unretrieved changes or changes that have not been previously retrieved by the sync client.

A sync request preferably includes sync request parameters and a token. FIG. 25 illustrates the structure and parameter options of exemplary sync request 2500 using Abstract Syntax Notation 1 (ASN1) encoding. Exemplary sync request 2500 is depicted as an ASN1 sequence, meaning an ordered collection of sync request parameters. Parameter 2510 ("starting point") defines a starting point for the changes requested. Exemplary values for this parameter include the following: (i) resume with token, which asks the directory server to provide all changes since the changes reflected in the token passed in the sync request; (which, preferably, originated in the response to a previous sync request); (ii) resume with CSN, which asks the directory server to provide all changes that were recorded after a specified CSN; (iii) beginning of change log, which asks the directory server to return all changes since the beginning of the change log; (iv) end of change log, which does not request any changes per se but instead requests that the directory server return a token that can be used in subsequent requests to request changes that were made strictly after the original request; and (v) change time, which asks the directory server to return all changes since a specific time. Preferably the default parameter is "resume with token." Options (ii) through (v) preferably are primarily used to get an initial token as a means to bootstrap the process. That is, the proxy server submits a request with beginning of change log or end of change log or by time or by CSN, and the token received in the response is used for the next request. Options (ii) through (v) may be used to obtain an initial token when the server first launches. Alternatively, options (ii) through (v) may be used to obtain an initial token when the server has no stored tokens that match the attributes of the search request.

Parameter 2520 (maxChanges) specifies a maximum number of changes to be returned and in an embodiment the default value is 500. Parameter 2525 (MaxTimeMillis) specifies how long to wait before returning changes and in an embodiment the default value is zero, meaning do not wait. Parameter 2530 (waitforMaxChanges) can be set to instruct the directory server not to respond until it has accumulated the number of changes specified in the maxChanges parameter.

Parameter 2550 (ContinueOnMissingChanges) is a flag that tells the directory server what to do if the directory server detects that the client has missed changes that were purged from the change log. In embodiments, the change log cannot keep every change since the server was installed, so typically it preserves changes for a user-configurable time duration, preferably about 2 days worth. However, if the token is older than the preservation period (e.g., if the last time the directory server returned a token was 3 days and the server's default preservation period is 3 days), then some changes may have been purged. In this case, the directory server will return an error unless ContinueOnMissingChanges is true, in which case, it will ignore the missed changes.

Parameter 2560 (changeSelectionCriteria) instructs the directory server to return changes containing, or excluding, all, none or specified attributes. Directories provide various mechanisms to restrict how a client can interact with the data in the directory. LDAP directories, for example, use access control information (ACI) and access control lists (ACL) to control what entries a client is allowed to access, and within those entries what attributes the client is allowed to access. Separate access can be granted for allowing entries and attributes to be read or written. Many criteria can be used to restrict access to entries. This includes where the entry exists in the DIT, for example, a client can be allowed to only access entries within a given base DN, or clients can be allowed access to everything except entries within a given base DN. Clients can also be given access to only certain types of entries (such as user entries) as defined by an LDAP filter. Access to individual attributes can also be restricted. For example, even if a client is allowed to read user entries, that client can be disallowed from reading sensitive attributes like the password attribute. In an embodiment, the directory allows the same ACI associated with the data to restrict what changes, or parts of a change, a client is allowed to read.

Conventional embodiments of a change log do not allow the contents of changelog entries to be restricted to exclude information about changes to entries or attributes that the client is not allowed to see in the data itself. In a conventional implementation, access to the cn=changelog data is all or nothing: if a client is given access to the changelog, it is allowed to see all changes in the changelog, even changes to entries or attributes to which the client ordinarily lacks permission to access. Therefore, access to change log data is restricted to only the most privileged client accounts, and clients that would otherwise benefit from having access to changes are not allowed to access them because they lack permission or cannot be trusted to see changes to all entries and attributes in the directory.

Embodiments provide support for paring down the contents of change log entries based on the access control restrictions that are in place for the entry that was added, deleted, or updated. In such embodiments, the contents of all change log entry attributes may be altered or removed based on what the requester can access in the target entry itself. The net effect is that a client will be able to see changes to an entry if and only if it has read access to the entry that was added/deleted/modified, and a client will be able to see changes to an attribute if and only if it has read access to that attribute on the changed entry. This allows change log access to be opened up to any client because there is no longer the danger of exposing directory information to a client that it is not allowed to see otherwise.

Parameter 2555 (pareEntriesForUserDN) restricts what details of the change are returned based on the access controls within the directory. This parameter ensures that a specific user of an application is not able to see change information for an entry in the change log when the client does not have access rights to view the entry. The pareEntriesForUserDN allows this paring down of the change log entry to be done for a specifically named user in addition to the user that is currently connected to the directory. If the pareEntriesForUserDN element is present in the request, then the changelog entry contents will be further pared down to match the intersection between what is accessible to the requester and the user specified in that pareEntriesForUserDN element. This allows a client to further restrict what is returned. For instance, an application (with its own dedicated bind DN) could allow end users to see changes to their own entry but only to attributes that the user is allowed to see by passing in a value of pareEntriesForUserDN that matches the user DN. The criteria used for paring down the change log entry contents preferably can be based on the identity of the client or other criteria provided in the request.

Sync request parameters in an embodiment may include sync request filter parameters, i.e., parameters that further restrict the changes that may be returned in response to a sync request. In an embodiment, parameters 2535 (includeBase) and 2540 (excludeBase) are examples of sync request filter parameters. Parameter 2535 (includeBase) specifies an inclusion filter for DN entries, meaning that the request should return only changes to entries with a base DN that matches the includeBase parameter. Parameter 2540 (excludeBase) specifies an exclusion filter for DN entries, meaning that changes to entries with base DN matching the excludeBase parameter should not be returned. In the event of a conflict, preferably the excludeBase parameter overrides the includeBase parameter. In embodiments that employ sync request filter parameters, preferably a token is used only with subsequent requests with identical sync request filter parameters.

Often a client is only interested in changes to certain attributes. For instance, an application might only need to trigger certain events based on a relatively infrequent change to a user's postal address. With conventional embodiments of a change log, there is no way to express in a change log query a request to only return change log entries that include changes to a list of attributes. Therefore, the directory must return all changes to the client, and the client must wade through the results for the few changes that it is interested in. This places unnecessary load on the directory infrastructure and the client and limits scalability.

By placing a value in the changeSelectionCriteria attribute 2560, a client can request 1) changes that were made to any of a list of attributes, 2) changes that were made to all of a list of attributes or 3) changes to all attributes except an ignored list of attributes. In an embodiment, the directory server creates and maintains an index of the attributes of each change log entry, and searches the index to efficiently locate change log entries that involve specific attributes. With the indexing, the number of change log entries that must be examined and returned to respond to a request that requests only changes in certain attributes is related to the percentage of changes that involve the requested attributes and not to the overall number of changes in the change log. Parameter 2545 (changeTypes) is another example of an exemplary sync request filter parameter. Parameter 2545 (changeTypes) specifies that only changes of a specified type (for example, adds, deletes, modifies, modify DN) are to be returned.

As described below, a token can be used, in embodiments of a directory service, to maintain state information, including identification of changes in a change log that have been previously exposed to a sync client. In such an embodiment, a directory server includes a token in the response to a sync request from a sync client. In embodiments the token is stored where it will be readily accessible to the sync client. In embodiments the token is opaque to the sync client. In alternative embodiments the sync client may be able to interpret and/or modify the contents of the token. When the sync client is ready to send another sync request to the directory server, the sync client preferably retrieves and returns the same token to the directory server. The directory server then uses the information in the token to reconstruct what changes the directory server provided to the sync client in the last request. In some respects the token is analogous to a bookmark that is used by the directory server to locate the place in the change log where the sync client last stopped reading.

FIG. 26A depicts an ASN1 encoding of the structure of an exemplary token 2600 that is returned by a directory server in response to a sync request. Exemplary token 2600 is an ordered collection comprising, preferably, a Sequence 2610 (i.e., an ordered collection) of change sequence numbers (CSNs). FIG. 26B depicts an ASN1 encoding of the structure of an exemplary CSN 2610, which preferably includes a replica ID to identify the specific dataset where the change was first made, a timestamp, and a sequence number. Alternative embodiments of exemplary token 2600 optionally may include data types to identify the type and version number of the token, a server ID, and a change log number.

FIG. 27A depicts an ASN1 encoding of the structure of an exemplary proxy token 2700 that is returned by a proxy server in embodiments of a directory service. Exemplary proxy token 2700 is an ordered collection comprising, preferably, a sequence 2720 of server token info 2710. As depicted in FIG. 27B, each instance of server token info 2710 comprises a sequence comprising Server Set identification data 2730 and a token 2600 (as shown in FIGS. 26A and 26B). The proxy server in embodiments uses server set identification data 2730 to keep track of different partitions of a partitioned dataset. Alternative embodiments of exemplary token 2700 optionally may include data types to identify the type and version number of the token and a server ID.

A response to a sync request is returned by a directory server or, in embodiments comprising a proxy server, a proxy server. An intermediate response by a directory server preferably returns a token and one change log entry matching the parameters requested by the sync client. After all changes have been returned to the sync client in intermediate responses, the directory server preferably returns a final result comprising a token. The sync client propagates the changes returned from the directory server to the sync destination, preferably another directory topology or a RDBMS. In an embodiment, a sync request is implemented as an extended LDAP operation and a sync response is the response to that operation.

FIG. 28 depicts an ASN1 encoding of exemplary final sync result 2800, which in the absence of an error preferably contains an ordered collection comprising a token. In embodiments, sync result 2800 may include information that may be useful to the sync client, including information that more changes in the change log are available, that changes have been purged, and the approximate number of changes remaining.

An exemplary synchronization sequence between one or more sync servers, one or more directory servers and a proxy server is depicted in FIG. 2. Generally speaking, the exemplary synchronization sequence illustrated in FIG. 2 comprises two processes, the exchange of sync requests and sync responses between a sync server and a proxy server, depicted in FIG. 23, and the process by which a directory server responds to a synchronization (or sync) request, depicted in FIG. 29.

Synchronization Process Between Sync Server and Proxy Server

Figure 23:
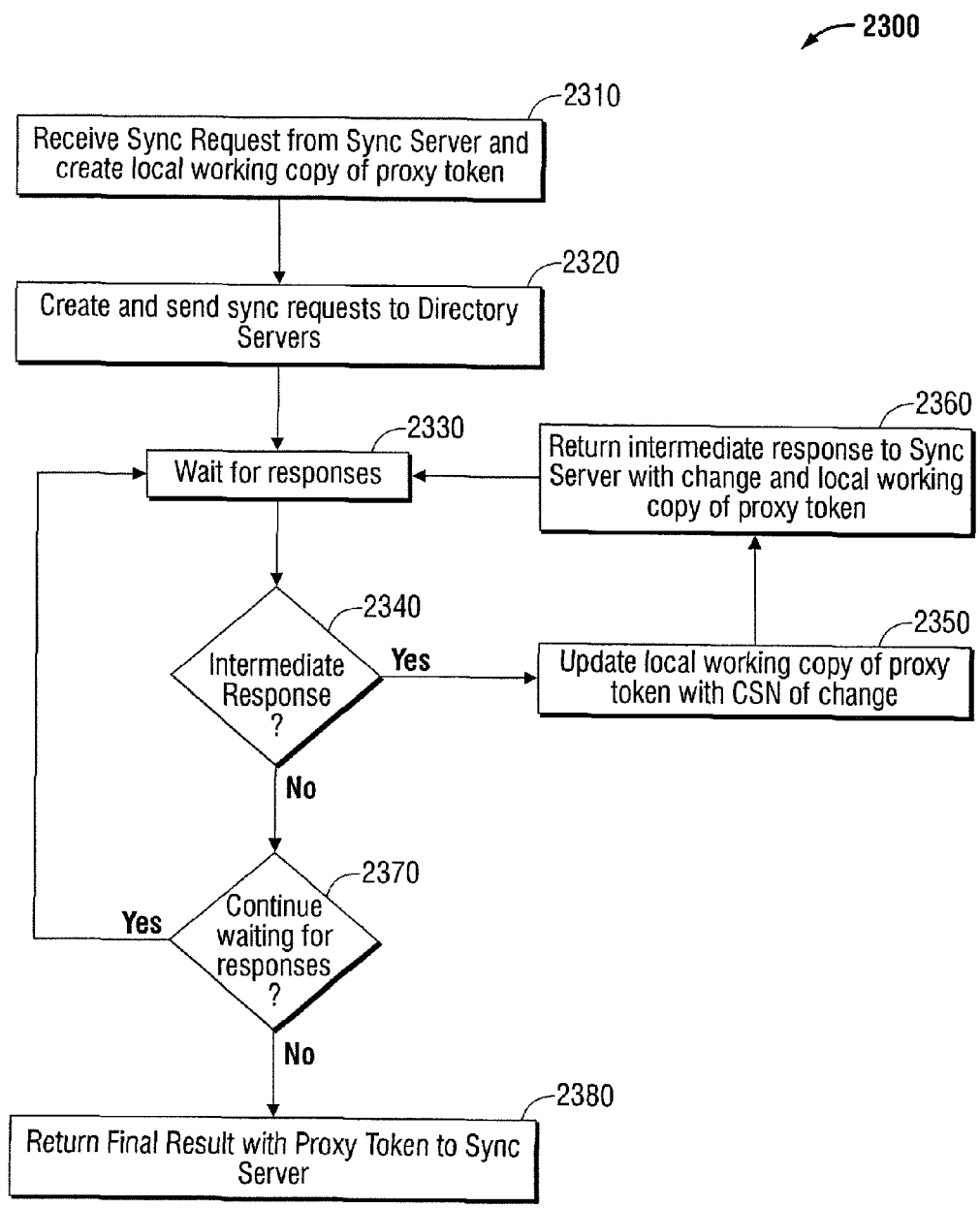
FIG. 23 is a flowchart of an exemplary method for responding to a sync request.

FIG. 23 shows the steps of an exemplary exchange of sync requests and sync responses between a sync server and a proxy server. In step 2310, the proxy server receives a sync request from a sync server. The sync request requests that the proxy server return some number of recent changes to one or more datasets bound to the sync server. The proxy server extracts the proxy token from the sync request and creates a local working copy of the proxy token. The proxy token identifies the last changes previously returned to the sync server for the datasets identified in the proxy token.

In step 2320, the proxy server constructs and sends a sync request to one or more directory servers. Preferably, the proxy server will send a sync request only to directory servers that have data in which the sync client is interested. For example, if the sync client requests changes to ou=sales, dc=example, dc=com and a directory server does not have any data under that base DN, the proxy server preferably will not send a request to that server. Preferably, the proxy server will send a request to one server in each replicated set of directory servers. The sync request to each directory server is constructed from the sync request parameters in the request from the sync server. For each request to a directory server, the proxy server constructs a token (using the contents of the proxy token) that identifies the last changes returned by that directory server to the sync server. In an embodiment, some of the datasets may be partitioned. The proxy server keeps track of the relationship between logical datasets, partitions of the logical dataset, dataset replicas and directory servers, and the proxy server handles the process of converting the sync server's request for changes to a logical dataset into multiple requests for changes from specific directory servers hosting different partitions of the logical dataset.

Figure 29:
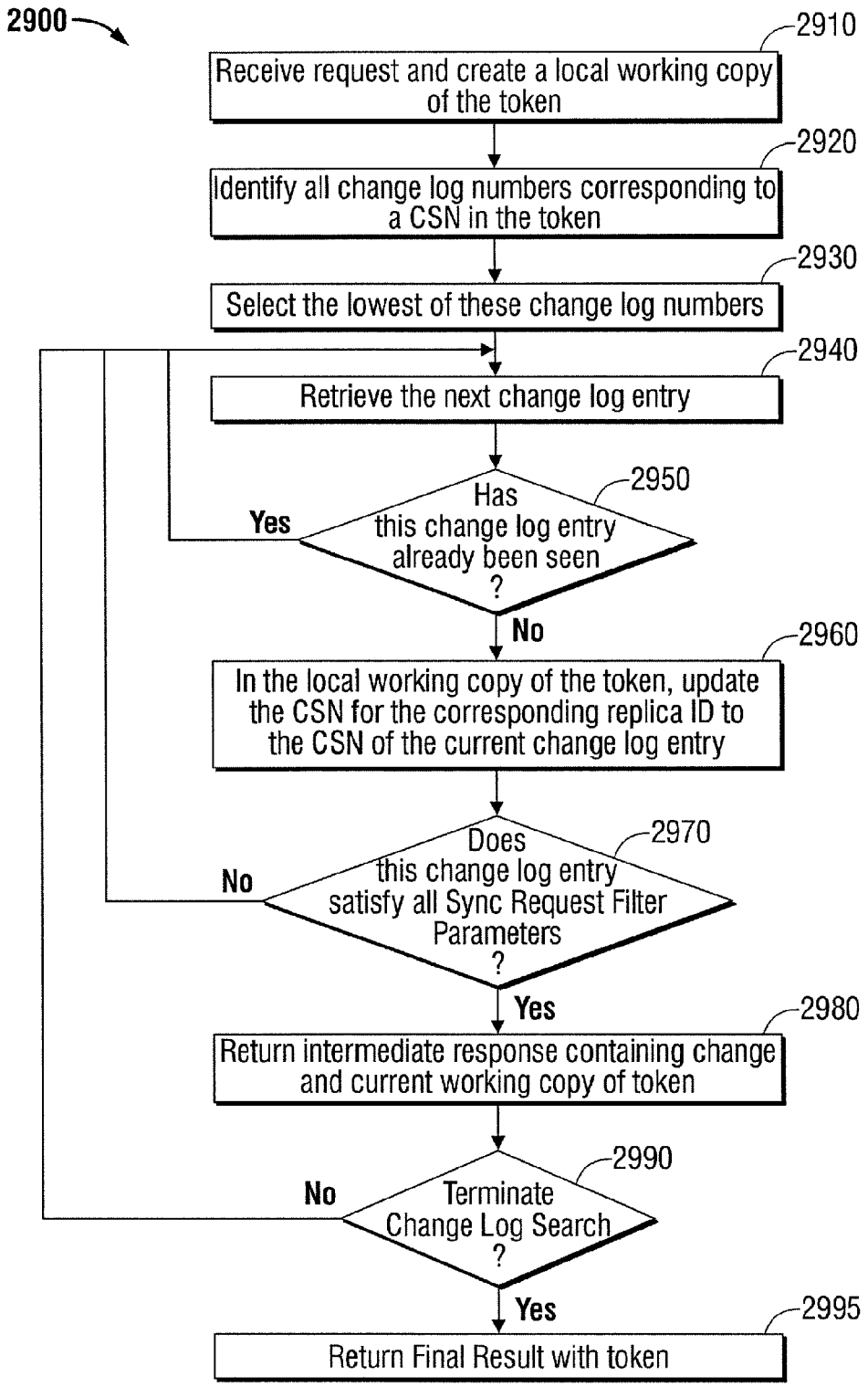
FIG. 29 is a flowchart of an exemplary method for responding to a sync request.

In step 2330, the proxy server has transmitted sync requests to one or more directory servers and is waiting for responses. FIG. 29, discussed in more detail below, describes generally an exemplary sequence of steps associated with a directory server's response to the sync request. As each response is received from a directory server, the proxy server determines, in step 2340, whether the response is an intermediate response. Preferably an intermediate response includes a single change log entry and a token containing a change sequence number for the change. If the response from a directory server is an intermediate response, the proxy server in step 2350 updates the local working copy of the proxy token with the CSN for the change. The CSN will identify the replica ID from which the change originated and will indicate the most recent change returned to the proxy server from that replica ID. In step 2360, the proxy server will return to the sync server an intermediate response including the change log entry and the updated local working copy of the proxy token. The proxy server continues to wait for new responses.

If the response received in step 2340 is not an intermediate response, preferably it is a final result from one of the directory servers. A final result from a directory server indicates that that directory server has completed the transmission of change log entries satisfying the sync request parameters. The final result includes a token, which the proxy server saves. In step 2370, the proxy server determines whether it is to continue waiting for responses, for example, if one of the directory servers has not yet returned a final result. After all of the directory servers have returned final results, in step 2380 the proxy server constructs a final result to return to the sync server. The final result returned from the proxy server to the sync server includes a proxy token constructed by the proxy server that combines the information from the tokens returned in the final results from each directory server. The proxy token indicates the most recent changes returned from each directory server for the datasets requested by the sync server and is stored by the sync server for use with the next sync request.

Directory Server's Response to a Synchronization Request

FIG. 29 shows the steps of an exemplary process 2900 for identifying which changes in a change log will be returned by a directory server in response to a sync request.

In step 2910, the directory server receives a sync request, extracts the token from the sync request, and creates a local working copy of the token. In an embodiment the sync request is received from a proxy server. The directory server will update this working copy of the token as it inspects each change log entry.

In step 2920, the directory server will retrieve each CSN from the token and, for each CSN in the token, the directory server will identify the change log number in the change log associated with the CSN. In step 2930, the directory server identifies the lowest of the change log numbers associated with the CSNs in the token. In an embodiment, the search of the change log will begin with the next change log entry because every change log entry with a change log number equal to or lower than the lowest of these change log numbers has been previously returned to the sync client in response to a request with the same sync request filter parameters.

As indicated in step 2940, the search for changes in the change log will begin with the next change log entry, meaning the change log entry having the next highest change log number. In step 2950, the next change log entry is examined to see if the change has been previously returned to the sync client. In an embodiment, this is determined by comparing the CSN in the next change log entry with the CSN in the token that includes the same replica ID as in the next change log entry. If the CSN in the next change log entry is less than or equal to a CSN in the token that shares the same replica ID as the next change log entry, the change log entry has been previously returned to the sync client, and the process returns to step 2940 to retrieve the next change log entry.

In step 2960, the directory server proceeds as if the change log entry has not been previously returned to the sync client. In an embodiment, the CSN for this change log entry will be returned to the sync client so that the sync client does not have to examine this change log entry again in another request with the same sync request filter parameters. The CSN in the local working copy of the token corresponding to the replica ID of the change log entry will be updated by replacing the CSN in the token with the CSN in the change log entry. In this way the local working copy of the token dynamically maintains the CSN for the most recent change log entry examined by the directory server for each replica ID.

In embodiments, there is a special case of step 2960 in which there is no CSN in the token to update. For example, if the sync request parameters exclude changes to a specific DN, and if the current change log entry is a change to that excluded DN, the token for the sync request will not include any CSN with a replica ID that matches the excluded DN and there will be no token entry to update. There is no risk that this change will be returned to the sync client, because it will not satisfy the sync request parameters, as discussed below. In an alternative embodiment in which the token tracks change log numbers in addition to CSNs, as discussed in more detail below, the change log number in the token will be updated to reflect the fact that this server has examined this change.

In step 2970, the directory server determines whether the change log entry satisfies all sync request filter parameters. This step may require examining the contents of the change in the change log entry. For example, if the sync request filter parameters request only changes to a specific base DN, the actual contents of the change in the change log entry would be compared to evaluate whether the change log entry contains a change to an entry in that specific base DN. If not, the process returns to step 2940 to start again with the next change log entry. If the change log entry satisfies all sync request filter parameters, in step 2980 the directory server returns to the sync client an intermediate response containing the change log entry and the updated working copy of the token.

In step 2990, the directory server checks for termination conditions. Exemplary termination conditions include: the search has reached the end of the change log; the directory server has returned the maximum number of results requested; the time limit specified in the MaxTimeMillis parameter has been met; and the directory server has received an instruction to stop searching. Another termination condition, in an embodiment, occurs when the number of change log entries that have been searched exceeds a pre-configured parameter, for example, 10× the maximum search results to be returned. If the client is only interested in a small subset of changes (based on attribute or base DN), this termination condition will ensure that the directory server does not take too much time looking through changes before sending a response. If no termination condition has been satisfied, the directory server returns to step 2940 to examine the next change log entry. Although each directory server is individually responsible for making sure it does not return more than the maximum number of results requested, only the proxy server (in an embodiment) has insight into what the other directory servers are doing. If, across all of the requests that it has sent, the proxy server receives the maximum number of results that it can send back to the client, then it will preferably instruct each directory server that is still working to cancel any more processing and return a final result.

If a termination condition has occurred, in step 2995 the directory server prepares and returns to the sync client the final result of the search request. The final result includes the updated current working copy of the token which has been during the search process. One advantage of returning the token at the end of the process is that the proxy might instruct the directory server to stop sending changes back because the proxy has reached the global limit of changes (e.g., 10 in our examples). FIG. 28 depicts the format of an exemplary final result of a sync request.

The exemplary processes depicted in FIGS. 23 and 29 are simplifications that omit details such as checking for missing or purged changes.

The exemplary process shown in FIG. 29 will be illustrated below in connection with the second sync request from proxy server 210 to directory server 220.

First Sync Request from Sync Server 240

For illustration purposes, the sync requests in the exemplary synchronization sequence 200 will be simple requests with few optional request parameters. For example, although not illustrated, each sync request preferably invokes the "resume with token" response, and each sync request preferably is interested in changes to all attributes, so no attribute indexing is used.

The sequence illustrated in FIG. 2 is initiated when sync server 240 sends a sync request 250 to proxy server 210. Exemplary sync request 250 includes proxy token 251, shown in FIG. 4B, and sync request parameters 252, shown in FIG. 4A, including maxResults equal to 10 and includeBase equal to ou=admin, dc=example, dc=com, ou=sales, dc=example, dc=com; and ou=users, dc=example, dc=com. Thus, sync request 250 expresses a request for up to ten new changes within ou=admin, dc=example, dc=com, ou=sales, dc=example, dc=com, and ou=users, dc=example, dc=com.

Exemplary token 251 is an instance of token 2700, as depicted in FIGS. 27A and 27B. For explanatory purposes, exemplary token 251 is a token that was returned with the results of a previous sync response (not shown) from proxy server 210 to sync server 240 and locally stored on sync server 240. Exemplary token 251 preferably matches each sync request filter parameter in sync request parameters 252.

In an embodiment, a token includes, for each dataset represented in the token, one and only one CSN that includes the replica ID for each instance of the dataset. With reference to FIGS. 22A and 4B, exemplary token 251 includes subtokens 440, 450, 460 and 470. Subtoken 440 references changes within ou=admin, dc=example, dc=com on replica IDs 221, 231, 227, 237 corresponding to change log entries 2222, 2223, 2224 and 2225 in change log 224 (FIG. 22A). Subtoken 450 references changes within ou=sales, dc=example, dc=com on replica IDs 206 and 205 corresponding to change log entries 2221 and 2228 in change log 224. Subtoken 460 references changes within one partition, identified as set 1, of ou=users, dc=example, dc=com on replica IDs 232 and 222 corresponding to change log entries 2205 and 2227 in change log 224. Subtoken 470 references changes within another partition, identified as set 2, of ou=users, dc=example, dc=com on replica IDs 226, 236 corresponding to change log entries 2281 and 2282 in change log 229 (FIG. 22B). Each subtoken preferably comprises CSNs having identical structure. For example, in FIG. 4B, subtoken 440 includes CSN 445 {221; 9:57:01; 1001} signifying the change with sequence number 1001 initially made to replica ID 221 at 9:57:01. For each dataset represented in the token, there is a CSN for each replica ID, and that CSN identifies the most recent change to that replica ID that has been previously exposed to sync client 240.

Exemplary sync request 250 requests changes (up to the maxResults parameter) that have been made since changes were last returned to the sync server. In an embodiment there is a special case (not illustrated) in which the sync request requests the earliest available change or all changes since the beginning of the change log. Such a request may be indicated in the request parameters, or may be indicated by an empty token. Such a request may be submitted, for example, when the sync server making the request has been newly launched.

Returning to FIG. 2, proxy server 210 has received sync request 250 from sync server 240. In embodiments proxy server 210 does not maintain a local change log of changes made to back-end directory servers to which it is linked. Consequently Proxy Server 210 must obtain change log data from directory servers hosting directory data identified in sync request parameters 252, i.e., ou=admin, dc=example, dc=com; ou=sales, dc=example, dc=com; and ou=users, dc=example, dc=com. Proxy server 210 preferably directs the request to one directory server in each replicated set.

Preferably using persistent mapping 314 (see Table 1, above), proxy server 210, in this example, sends a sync request to directory server 220 to obtain changes to base DN ou=admin, dc=example, dc=com, base DN ou=sales, dc=example, dc=com, and base DN ou=users, dc=example, dc=com (set 1), and a sync request to directory server 225 to obtain changes to base DN ou=users, dc=example, dc=com (set 2). From sync request 252, proxy server 210 constructs two sync requests: sync request 269, which is sent to directory server 220 and illustrated in FIG. 5A, and sync request 278, which is sent to directory server 225 and illustrated in FIG. 6A.

Proxy server 210 constructs sync request 269 to include sync request parameters 270, depicted in FIG. 5A, and token 271, depicted in FIG. 5B. Sync request parameters 270 in sync request 269 include a request for up to ten changes from the datasets with base DN ou=admin, dc=example, dc=com, base DN ou=sales, dc=example, dc=com, and base DN ou=users, dc=example, dc=com. Proxy server 210 constructs sync request 278 to include sync request parameters 280, depicted in FIG. 6A, and token 279, depicted in FIG. 6B. Sync request parameters 280 in sync request 278 include a request for up to ten changes from the dataset with base DN ou=users, dc=example, dc=com. Proxy server 210 does not include a request for changes to the dataset with base DN ou=admin, dc=example, dc=com because that dataset is not partitioned and is replicated on directory server 220 and proxy server 210 has already queried directory server 220 via sync request 269.

Proxy server 210 constructs tokens 271 and 279 using the contents of proxy token 251. Because sync request 269 is requesting changes to base DN ou=admin, dc=example, dc=com, base DN ou=sales, dc=example, dc=com, and base DN ou=users, dc=example, dc=com, proxy server 210 preferably constructs token 271 from subtokens 440, 450 and 460 from token 251 (FIG. 4B). Because sync request 278 is requesting changes to base DN ou=users, dc=example, dc=com, proxy server 210 preferably constructs token 279 from subtoken 470 from token 251 (FIG. 4B).

Directory server 220 receives sync request 269 (FIG. 5A) at time 2211, which is depicted in FIG. 22A as 10:05:05. Directory server 220 extracts token 271 from sync request 269 (FIGS. 5A, 5B).

Comparing the CSNs in token 271 with the change log entries in change log 224, directory server 220 determines that token 271 includes CSN {206; 9:56:31; 1001}, that this CSN corresponds to change log entry 2221 (FIG. 22A), and that change log entry 2221 has the lowest change log number, 5026, of all the change log entries identified in token 271. Directory server 220 begins searching change log 224 at the next change log entry, i.e., the change log entry with change log number 5027. Using, preferably, the exemplary process shown in FIG. 29, directory server identifies change log entries 2241, 2242 and 2243 as the latest changes (i.e., the changes received before time 2211) that have not been previously returned to the sync client and that satisfy the sync request parameters.

In an embodiment, and as depicted in FIG. 29, the directory server transmits the individual change log entries serially to the sync client. FIGS. 13 and 30A-30G illustrate this process with respect to the changes returned by directory server 220 in response to sync request 269. Each individual change is returned in an intermediate response. As depicted in FIG. 30A, an intermediate response 3000 preferably includes a token and the change contents of one change log entry. In an embodiment, directory server 220 creates a local working copy of token 271, which it updates as it searches change log 224.

Change log entry 2241 (FIG. 22A) contains the first change returned by directory server 220 to the sync client. FIG. 30B shows intermediate sync response 3010 which is transmitted first and transmits the change contents 3016 for change log entry 2241. Intermediate sync response 3010 includes token 3015. As shown in FIG. 30C, token 3015 is the same as token 271 (see FIG. 5B), the token originally sent from proxy server 210 to directory server 220, with one difference. The difference 3017 between token 271 and token 3015 is that the CSN for replica ID 232 in token 271 has been replaced with CSN {232; 10:03:21; 1001}, the CSN for change log entry 2241. In this example, each of the change log entries between the change with change log number 5026 (change log entry 2221) and the change with change log number 5035 (change log entry 2241) had been previously returned to the sync client, as indicated by the contents of token 271, and so there are no other updates to the CSNs in token 3015.

Change log entry 2242 (FIG. 22A) contains the next change returned by directory server 220 to the sync client. FIG. 30D shows intermediate sync response 3020 which is transmitted next and contains the change contents 3026 for change log entry 2242. Intermediate sync response 3020 includes token 3025. As shown in FIG. 30E, token 3025 is the same as token 3015 (see FIG. 30C), with one change. The one change 3027 between token 3025 and token 3015 is that the CSN for replica ID 205 in token 3025 is {205, 10:04:32, 1001}, the CSN for change log entry 2242.

Change log entry 2243 (FIG. 22A) contains the third change returned by directory server 220 to the sync client. FIG. 30F shows intermediate sync response 3030 which is transmitted next and contains the change contents 3036 for change log entry 2243. Intermediate sync response 3030 includes token 3035. As shown in FIG. 30G, token 3030 is the same as token 3020 (see FIG. 30E), with one change. The one change 3037 between token 3035 and token 3025 is that the CSN for replica ID 221 in token 3035 is {221, 10:05:01, 1001}, the CSN for change log entry 2243. The person of ordinary skill will readily perceive that serial transmission of individual changes as described here minimizes the danger that changes will be dropped or omitted in the event of an extraordinary interruption of the synchronization process.

Referring now to FIG. 2, directory server 220 returns the change contents of change log entries 2241, 2242 and 2243 in intermediate responses 272. Intermediate responses 272 include, in this example, intermediate sync responses 3010, 3020, 3030 (FIG. 30B, 30D, 30F). Intermediate responses 272 include intermediate response changes 274, which in this example include content changes 3016, 3026, 3036 (FIGS. 30B, 30D, 30F). Intermediate response tokens 273 include tokens 3015, 3025, 3035 (FIG. 30C, 30D, 30G). After transmitting intermediate responses 272, directory server 220 next transmits final result 214 (FIG. 13) to its sync client, proxy server 210. Final result 214 includes token 1300, which in this example is identical to token 3035 (FIGS. 13, 30G).

The exemplary process described above for identifying returnable changes in a change log, constructing a token, and transmitting the changes are typical of the steps preferably performed when a directory server responds to a sync request in an embodiment, and will not be repeated in detail in the ensuing discussion of responses by a directory server to a sync response. Preferably the changes will be transmitted by the directory server through serial transmission of intermediate responses and final results as described above, and that process will not be described in detail.

Referring to FIGS. 2, 6A and 6B, directory server 225 receives exemplary sync request 278 at time 2214, which as depicted in FIG. 22B is 10:05:05. Sync request 278 includes token 279 and sync request parameters 280. In the manner generally described above with respect to FIG. 29 and FIGS. 30A-30G, directory server 225 searches change log 229 and determines that change log entries 2283 and 2284 (FIG. 22B) have not been seen by the sync client and satisfy the search parameters and thus should be returned to proxy server 210. Via intermediate responses 290 and intermediate response changes 292, directory server 225 returns to proxy server 210 the change contents in change log entries 2283, 2284. Intermediate response tokens 279 include token 700 (FIG. 7), which is returned with the intermediate response that transmits the change contents from change log entry 2283, and token 800 (FIG. 8), which is returned with the intermediate response that transmits the change contents from subsequent change log entry 2284. The CSN for replica ID 236 in token 800 is unchanged from token 279 because change log 229 included no new changes to replica ID 236 prior to time 2214. After sending intermediate responses 290, directory server 225 sends final result 215 with token 800 (FIG. 8).

As mentioned above in the discussion of FIG. 23, when proxy server 210 receives an intermediate response from a directory server, it returns an intermediate response to sync server 240, its sync client in this example. This process will be described with respect to the changes returned by directory servers 220, 225 in response to sync request 269 and 278. As discussed above and depicted in FIGS. 30B, 30D, and 30F, directory server 220 returns the contents of change log entries 2241, 2242 and 2243 (FIG. 22A) serially to proxy server 210 via intermediate responses 272. Similarly, directory server 225 returns the contents of change log entries 2283, 2284 (FIG. 22B) serially to proxy server 210 via intermediate responses 290. These individual changes are returned by proxy server 210 to sync server 240 serially via intermediate responses 253 and intermediate response changes 254.

FIGS. 30H-30L depict the contents of the intermediate response proxy tokens 255 returned by proxy server 210 to sync server 240 with each intermediate change response. FIG. 30H depicts intermediate response proxy token 3045 which is returned to sync server with the change contents for change log entry 2241. FIG. 30I depicts intermediate response proxy token 3050 which is returned to sync server with the change contents for change log entry 2283. FIG. 30J depicts intermediate response proxy token 3055 which is returned to sync server with the change contents for change log entry 2284. FIG. 30K depicts intermediate response proxy token 3060 which is returned to sync server with the change contents for change log entry 2242. FIG. 30L depicts intermediate response proxy token 3065 which is returned to sync server with the change contents for change log entry 2243. In each case, proxy server 210 constructs the intermediate response proxy token by updating the CSN in the local working copy of the proxy token with the CSN in the change log entry for the change that is transmitted to sync server 240. Since the directory servers are sending back changes intermittently, the proxy server returns the changes to the sync server as it receives them; there is no specific order other than that, in an embodiment, changes sent by a single directory server will not be re-ordered.

After it receives final result 214 from directory server 220 and final result 215 from directory server 225, proxy server 210 merges the tokens 1300 and 800 (FIGS. 8, 13) to construct the proxy token 900 (FIG. 9) returned to sync server 240 with final result 211 (FIG. 2).

Proxy server 210 optionally may preprocess the change log entries. For example, proxy server 210 may perform data transformations to transform change data from the format used on the directory server to the format expected by the sync server. In an embodiment such data transformations include user-specified data transformations.

The tokens exchanged between a proxy server and a sync client in embodiments differ from the tokens exchanged between a directory server and a sync client in that the tokens exchanged between a proxy server and a sync client preferably are organized by dataset. Token 251 (FIG. 4B) illustrates this organization.

Proxy server preferably constructs proxy token 900 as follows. The proxy server preferably keeps track of the mapping between datasets and replica IDs. For example, proxy 210 knows that replica IDs 205, 206 are replicas of ou=sales, dc=example, dc=com, and replica IDs 221, 231, 227 and 237 are replicas of ou=admin, dc=example, dc=com. In an embodiment this mapping is user-configurable. Proxy server 210 uses this mapping to construct proxy token 255 from tokens 1300, 800 returned by directory servers 220, 225. As shown in FIG. 9, the most-recently exposed changes to replicas of ou=admin, dc=example, dc=com are in subtoken 940, the changes to replicas of ou=sales, dc=example, dc=com are in subtoken 950, the changes to replicas of ou=users, dc=example, dc=com (set 1) are in subtoken 960, and the changes to replicas of ou=users, dc=example, dc=com (set 2) are in subtoken 970.

Sync server 240 extracts token 900 from final result 211 and preferably stores token 900 for use in subsequent sync requests. Sync server 240 propagates the changes it has received to RDBMS 241. In an embodiment, the directory changes received by sync server 240 are translated into the data schema used by RDBMS 241 and applied to RDBMS 241 using a database connectivity API (such as, for example, a Java database connectivity driver) in a manner known to those of skill in the art.

As described above, proxy server 210 has responded to sync request 250 from sync server 240 by returning all new changes within logical dataset 202, the directory having base DN ou=users, dc=example, dc=com (in addition to new changes in ou=sales, dc=example, dc=com and ou=admin, dc=example, dc=com). Although portions of logical dataset 202 are stored on different datasets hosted on physically different directory servers, the complexity of the structure and organization of the back-end directory servers is concealed from sync server 240. By providing a single access point to multiple back-end change logs, the proxy server provides a unified change log to its sync client and frees the sync client from the burden of juggling, in real time, each individual change on each logical dataset and each physical directory server.

Second Sync Request from Sync Server 240

Now described is a second exemplary sync request 256 sent by sync server 250 to proxy server 210. As shown in FIG. 10A, sync request 256 includes sync request parameters 258 and token 257. Sync request parameters 258 includes a request for up to 10 changes (maxResults=10) within datasets with base DN ou=admin, dc=example, dc=com, base DN ou=sales, dc=example, dc=com, and base DN ou=users, dc=example, dc=com. Token 257 preferably (and as indicated in FIG. 10B) is identical to token 900 that was returned by proxy server 210 with the previous final result 211.

Proxy server 210 sends sync request 284 to directory server 220 and sync request 299 to directory server 225. In this exemplary synchronization sequence, proxy server 210 instructs directory server 220 to return changes within base DNs "ou=sales, dc=example, dc=com" and "ou=users, dc=example, dc=com" and proxy server 210 instructs directory server 225 to return changes within base DNs "ou=admin, dc=example, dc=com" and "ou=users, dc=example, dc=com". In an embodiment, although proxy server 210 understands the difference between the datasets that store the Set 1 partition (datasets 222, 232) and the datasets that store the set 2 partition (datasets 226, 236), this information is not known to the back-end directory servers 220, 225, and each directory server only knows that it stores ou=users, dc=example, dc=com.

Sync request 284 includes sync request parameters 286 (shown in FIG. 11A) and token 285 (shown in FIG. 11B). Using persistent mapping 314 (see Table 1, above) of partitions and base DNs, proxy server 210 constructs sync request parameters 286 to include base DNs ou=sales, dc=example, dc=com and ou=users, dc=example, dc=com. Similarly, proxy server 210 constructs token 285 by collecting into a single token the CSNs shown in FIG. 10B for subtokens 950 (for replicas of ou=sales, dc=example, dc=com) and 960 (for replicas of ou=users, dc=example, dc=com (set 1)).

Sync request 299 includes sync request parameters 248 (shown in FIG. 12A) and token 247 (shown in FIG. 12B). Using persistent mapping 314 of partitions and base DNs, proxy server 210 constructs sync request parameters 248 to include base DNs ou=admin, dc=example, dc=com and ou=users, dc=example, dc=com. Similarly, proxy server 210 constructs token 247 by collecting into a single token the CSNs shown in FIG. 10B for subtokens 940 (for replicas of ou=admin, dc=example, dc=com) and 970 (for replicas of ou=users, dc=example, dc=com (set 2)).

Directory server 220 receives exemplary sync request 284 at time 2213, which as depicted in FIG. 22A is 10:06:59. In the manner described above with respect to the exemplary algorithm in FIG. 29, directory server 220 examines change log 224 (FIG. 22A), Sync Request Parameters 286 and token 285 (FIG. 11B) to identify changes satisfying the criteria of the sync request. Now follows a description of the operation of the exemplary algorithm shown in FIG. 29 as applied in connection with searching change log 224 for change log entries that satisfy the criteria of sync request parameters 286.

Comparing the CSNs in token 285 with the change log entries in change log 224, directory server 220 determines that token 285 includes CSN {206; 9:56:31; 1001}, that this CSN corresponds to change log entry 2221 (FIG. 22A), and that change log entry 2221 has the lowest change log number, 5026, of all the change log entries identified in token 285. (FIG. 29, step 2930) Directory server 220 begins searching change log 224 at the next change log entry, i.e., change log entry 2222 with change log number 5027.

Change log number 5027 is a change to replica ID 221, which is a replica of ou=admin, dc=example, dc=com. There is no CSN for replica ID 221 in token 285 (FIG. 29, step 2950) and directory server 220 concludes that it has not returned this change previously to the sync client. In step 2960 (FIG. 29) directory server 210 compares the details of the change log entry with Change log number 5027 to the Sync Request Parameters 286. The change log entry at Change log number 5027 (FIG. 22A) reflects a change to uid=admin1, ou=admin, dc=example, dc=com. Because the sync request parameters 286 include a filter parameter, includeBase={ou=sales, dc=example, dc=com; ou=users, dc=example, dc=com}, which is different from the base DN in the change log entry (i.e., ou=admin, dc=example, dc=com), this change does not satisfy the sync request parameters and change log number 5027 is not returned to the sync client. Similarly, directory server 220 determines that it has not previously returned the changes at change log numbers 5028 through 5030, change log entries 2223-2225 (FIG. 22A), in response to a request with the same filter parameters. For each of these changes, directory server 220 determines that the change does not satisfy one or more of the filter parameters because none of these change log entries reflect a change to any entry within ou=sales, dc=example, dc=com or ou=users, dc=example, dc=com.

Directory server 220 determines that the changes with change log numbers 5031-5033, change log entries 2226-2228, have been previously returned to the sync client because the CSN for each of these change log entries is less than or equal to the CSN in token 285 for the corresponding replicaID. For example, the CSN with change log number 5033 {205, 10:00:01, 1001}, is less than or equal to the CSN in token 285 for replica ID 205, i.e., {205, 10:04:32, 1000}. Similarly, directory server 220 determines that change log entries with Change log numbers 5034, 5035 and 5036 (change log entries 2205, 2241 and 2242) have been previously returned to the sync client, because CSN for each of these change log entries is less than or equal to the CSN for the corresponding replica ID in token 285. The change at Change log number 5037 (change log entry 2243) reflects a change to an entry within ou=admin, dc=example, dc=com and thus does not match the Sync Request Parameters 286.

Next is change log number 5038 (change log entry 2244) with CSN {222; 10:06:01k 1001} which is greater than, and was recorded after, the corresponding CSN for replica ID 222 in token 285, {222, 10:02:01, 1001}. Directory server replaces the CSN for replica ID 222, {222, 10:02:01, 1001}, in the local working copy of token 285 with the CSN for Change log number 5038, i.e., {222, 10:06:01, 1001} (FIG. 29, step 2960). FIG. 11C shows the current working copy 1110 of token 285 after this change. The change is made to base DN ou=users, dc=example, dc=com, so this change satisfies the sync request parameters (FIG. 29, step 2970. Directory server 220 returns this change to proxy server 210 along with updated token 1110 (FIG. 29, step 2980) and examines the next entry.

Directory server 220 determines that the next change, change log number 5039 (change log entry 2245), has not been previously returned to the sync client because the CSN for this change, {206; 10:06:36; 1001} is greater than the CSN for replica ID 206 in token 285. The CSN in token 285 for replica ID 206 is replaced with the CSN for change log entry 2245. FIG. 11D shows the current working copy 1120 of token 285 after this change. The change satisfies sync request parameters 286 because it is a change to uid=sales5, ou=sales, dc=example, dc=com. Directory server 220 returns this change to proxy server 210 via an intermediate response along with updated token 1120 (FIG. 29, step 2980) and examines the next entry.

The next entry is change log number 5040, which does not match the search request parameters because it is a change to an entry within ou=admin, dc=example, dc=com. Directory server 220 determines that the next entry, change log number 5041 (change log entry 2247) has not been previously returned to the sync client because the CSN for the change, {222; 10:06:44; 1001} is higher than the CSN in token 285 for replica ID 222. The CSN in token 285 for replica ID 222 is replaced with the CSN for change log entry 2247. FIG. 11E shows the current working copy 1130 of token 285 after this change. The change satisfies sync request parameters 286 because it is a change to uid=user6, ou=users, dc=example, dc=com. Directory server 220 returns this change to proxy server 210 via an intermediate response along with updated token 1130 (FIG. 29, step 2980).

The intermediate responses described above are depicted in FIG. 2 as intermediate responses 287 including intermediate response changes 288 (change contents from change log entries 2244, 2245, 2247) and intermediate response tokens 289 (tokens 1110, 1120, 1130). There are no more entries in exemplary change log 224, which is a termination condition (FIG. 29, step 2290). Directory server 220 now returns token 1130 in final result 216 to proxy server 210.

Directory server 225 receives exemplary sync request 299 with sync request parameters 248 (FIG. 12A) and token 247 (FIG. 12B) from proxy server 210 at time 2216 (10:06:59). Applying the same logic described above to change log 229 (FIG. 22B), token 247 and sync request parameters 248, directory server 225 determines that change log entries 2286, 2287 and 2288 have not been previously returned to the sync client and satisfy the sync request parameters. Directory server 225 returns intermediate responses 228 including intermediate response changes 239 (change contents from change log entries 2286, 2287 and 2288) and intermediate response tokens 289. Since there are no more entries in exemplary change log 229, directory server 225 returns token 1400, shown in FIG. 14, in final result 217 to proxy server 210.

Exemplary change log entry 2285 in change log 229 is identical to exemplary change log entry 2243 in change log 224. (FIGS. 22A, 22B). From the perspective of directory server 225, change log entry 2285 would ordinarily be considered to be a "new" change in change log 229 because directory server 225 has not previously returned the change to the sync client. However, change log entry 2285 in change log 229 (FIG. 22B) reflects a change to a global dataset (ou=admin, dc=example, dc=com) and the same change log entry 2243 in change log 224 (FIG. 22A) was previously returned to the sync client by directory server 220, as indicated in tokens 3035 and 900 (FIGS. 9, 30G). The CSN for change log entry 2243 was included in token 247 (FIG. 12B), thereby preventing directory server 225 from returning to proxy server 210 a change that had been previously retrieved by the sync client.

As it receives intermediate response changes 238, 288 from directory servers 220, 225, proxy server 210 returns the changes to sync server 240 via intermediate responses 259, intermediate proxy tokens 261, and intermediate response changes 260. After it receives final result 216 and token 1130 from directory server 220 and final result 217 and token 1400 from directory server 225, proxy server 210 merges the tokens 1130 and 1400 (FIGS. 11E, 14) in the manner described above to construct the proxy token 1500 (FIG. 15) returned to sync server 240 with final result 212 (FIG. 2). Sync server 240 extracts token 1500 from final result 212 and stores it for use subsequent sync requests.

Sync Request from Sync Server 245

FIG. 2 depicts an exemplary sync request 262 sent from sync server 245 to proxy server 210. Sync request 262 includes sync request parameters 264 (FIG. 16A) and exemplary token 263 (FIG. 16B). Sync request parameters 264 includes a request for up to 10 changes (maxResults=10) to entries within ou=users, dc=example, dc=com. The dataset ou=users, dc=example, dc=com has been partitioned into two partitions, identified by proxy server 210 as ou=users, dc=example, dc=com (set 1), stored on replica IDs 222, 232 and ou=users, dc=example, dc=com (set 2), hosted on replicas 226, 236. Proxy server therefore prepares and sends sync request 275 to directory server 220 and sync request 293 to directory server 225.

Sync request 275 includes sync request parameters 276 (FIG. 17A) and token 277 (FIG. 17B). Sync request parameters 276 include a request for up to 10 (maxresult=10) changes to the dataset with base DN ou=users, dc=example, dc=com and token 277. Proxy server 210 constructs token 277 by extracting the tokens with CSNs corresponding to replica IDs 222, 232 served by directory server 220.

Directory server 220 receives exemplary sync request 275 at time 2212, 10:06:12 (FIG. 22A). Applying the same logic described above to change log 224 (FIG. 22A), token 277 and sync request parameters 276, directory server 220 determines that change log entries 2205, 2241 and 2244 have not been previously returned to the sync client and satisfy the sync request parameters. Directory server 220 returns intermediate responses 281 including intermediate response changes 282 (change contents from change log entries 2205, 2241 and 2244) and intermediate response tokens 283. As there are no more changes in change log 224 at time 2212, directory server 220 returns token 1900 (FIG. 19) in final result 218 to proxy server 210.

Directory server 225 receives exemplary sync request 293 with sync request parameters 294 (FIG. 18A) and token 295 (FIG. 18B) from proxy server 210 at time 2215 (10:06:12). Applying the same logic described above to change log 229 (FIG. 22B), token 295 and sync request parameters 294, directory server 225 determines that change log entries 2282, 2283 and 2284 satisfy the sync request parameters and have not been previously returned to the sync client. Directory server 225 returns intermediate responses 296 including intermediate response changes 298 (change contents from change log entries 2282, 2283 and 2284) and intermediate response tokens 297. Since there are no more entries in exemplary change log 229 at time 2215, directory server 225 returns token 2000 (FIG. 20) in final result 219 to proxy server 210. Token 2000 includes the updated CSNs reflecting the changes in change log entries 2283, 2283 and 2284.

As it receives intermediate response changes 282, 298 from directory servers 220, 225, proxy server 210 returns the changes to sync server 245 via intermediate responses 265, intermediate proxy tokens 267, and intermediate response changes 266. After it receives final result 218 and token 1900 from directory server 220 and final result 219 and token 2000 from directory server 225, proxy server 210 merges the tokens 1900 and 2000 (FIGS. 19, 20) in the manner described above to construct the proxy token 2100 (FIG. 21) returned to sync server 245 with final result 213 (FIG. 2). Sync server 245 extracts proxy token 2100 from final result 213 and stores it for use with subsequent sync requests.

Changes to any dataset, for example, dataset 246, can be propagated to similar datasets hosted on other directory servers using the same processes as described here. For example, in an embodiment, any directory server can include a sync server. In an embodiment, directory server 220 can request changes to dataset 246 in the manner described above by submitting a sync request to proxy server 210, which will then request the change log from directory server 245 and then transmit the change log entries received from directory server 245 back to directory server 220.

FIG. 2 is intended to illustrate an exemplary sequence of responses and requests among sync servers, directory servers and a proxy server. It is not intended to illustrate the temporal relationship between, on the one hand, requests and responses between proxy server 210 and sync servers 240, 245, and, on the other hand, requests and responses between proxy server 210 and directory servers 220, 225.

Alternative Embodiment of an Exemplary Token

The synchronization sequence as described above is sufficient for guaranteeing that a sync client does not receive any changes twice and does not miss any changes. However, the efficiency of the process depicted in FIG. 29 could be improved by eliminating the need to reexamine change log entries that have been previously examined in connection with a sync request from the same client. For example, in the second request from sync server 240 discussed above, directory server 220 had to review change log entries with change log numbers 5027 through 5037 even though those specific change log entries had been previously disclosed to sync client 240 (as indicated in proxy token 251 and token 271). In an alternative embodiment, additional information is provided in the token that allows the directory server that generated the token to more quickly resume if it receives the same token back in a subsequent sync request.

FIG. 31 illustrates the ASN1 format of an exemplary token 3100 in an alternative embodiment. As shown in FIG. 31, the token returned by a directory server in this alternative embodiment includes server ID data that identifies the directory server that generated the token and the change log number that was last examined for this token.

FIGS. 32-40 show the contents of tokens during a synchronization sequence in this alternative embodiment. For simplicity, FIGS. 32-40 use changes logs 224 and 229 and replicate the same sync requests and responses as were illustrated and discussed above in connection with the responses to sync requests 250, 269, 278, 256, 284, 299. The tokens, however, will be different, as discussed below.

In this alternative embodiment, token 3200 in FIG. 32 corresponds to token 1300 (FIG. 13), which was returned to proxy server 210 in final result 214 by directory server 220 in response to sync request 250 from sync server 240. Using the same logic described previously in connection with the response by directory server 220 to sync request 269, directory server 220 determines that the first change log entry to examine in change log 224 will be change log entry 2222 with change log number 5027. Directory server 220 will examine changes at change log numbers 5027 through 5037 and return changes with change log numbers 5035, 5036, and 5037. In the alternative embodiment, however, directory server 220 constructs and returns token 3200, shown in FIG. 32, which differs from token 1300 (FIG. 13) by also identifying directory server 220 (server ID=220) as the source of the token and identifying change log number 5037 as the last change log number in change log 224 examined by directory server 220.

Similarly, FIG. 8 shows the contents of token 800 returned to proxy server 210 by directory server 225 in final result 215 in response to sync request 278. Token 3300 in FIG. 33 corresponds to token 800 (FIG. 8) and shows how the contents of the token would be different in the alternative embodiment. When directory server 225 receives token 279 (FIG. 6B), it starts searching change log 229 at change log number 602 and identifies the returnable changes as change log entries 2283, 2284 with change log numbers 603, 604 (FIG. 22B). Directory server 225 prepares an updated token 3300, shown in FIG. 33, which differs from token 800 by also identifying directory server 225 (server ID=225) as the source of the token and identifying change log number 604 as the last change log entry on directory server 225 identified in the token.

Proxy server 210 merges tokens 3200 and 3300 into proxy token 3400, shown in FIG. 34. The server ID and change number information is included with each dataset. Subtokens 3410, 3420 and 3430 each collect CSNs for changes recorded in change log 224 on directory server 220, so proxy server 210 also includes in those subtokens the server ID and change log number information from token 3200 sent by directory server 220. Subtoken 3440 collects CSNs for changes recorded in the change log 229 on directory server 225, so proxy server 210 includes in subtoken 3440 the server ID and change log number information from token 3300 sent by directory server 225.

The second request 256 from sync server 240 to proxy server 210 includes a token that is identical to proxy token 3400 (FIG. 34), i.e., the token received from proxy server 210 in response to the first sync request. Proxy server 210 instructs server 220 to satisfy the request for changes within the datasets "ou=sales, dc=example, dc=com" and "ou=users, dc=example, dc=com (set 1)." Because token 3200, the token previously returned by directory server 220 in response to a previous request from proxy server 210, included token entries for replica IDs for these datasets (FIGS. 22A, 32), proxy server 210 can include the server ID (220) and changeNumber (5037) information in token 3500 (shown in FIG. 35) which it sends to directory server 220 in sync request 284.

Proxy server 210 also instructs server 225 to satisfy the request for changes to entries within "ou=admin, dc=example, dc=com" and "ou=users, dc=example, dc=com (set 2)". However, because token 3300 (FIG. 33), the token previously returned by directory server 225 in response to a previous request by proxy server 210, did not include any token entries for replica IDs for one of these datasets (i.e., "ou=admin, dc=example, dc=com"), proxy server 210 cannot take advantage of this feature and does not include server ID or changeNumber information in token 3600 (FIG. 36) which it sends to directory server 225.

Because its server ID matches the server ID parameter in token 3500, directory server 220 knows that it can begin its search of change log 224 with the change log number immediately after change log number 5037, i.e., the change log number returned in token 3500. Directory server 220 examines change log entries with change log numbers 5038 to 5041 and returns the changes with change log numbers 5038, 5039, and 5041. Directory server 220 returns token 3700 (shown in FIG. 37), again including the server ID (220) and the change log number for the last change returned to the sync client (change log number=5041). In this alternative embodiment, directory server 220 was able to avoid examining all change log entries prior to change log number 5038.

Applying the same logic, directory server 225 responds to the sync request by reviewing the change log entries in change log 229 with change log numbers 0596 through 0608 and identifies the changes with change log numbers 606 to 608 (change log entries 2286, 2287, 2288) as changes to return to proxy server 210. Directory server 225 also returns token 3800 (shown in FIG. 38) to proxy server 210. Proxy server 210 merges tokens 3700, 3800 (FIGS. 37, 38) into proxy token 3900 (shown in FIG. 39) and returns proxy token 3900 to sync server 240.

In embodiments, changes can be made to the directory topology without interrupting delivery of changes to a sync client. No changes are lost and no duplicate changes are delivered. Topology changes include adding new directory server replicas to the topology where they contain only data that is already replicated in the topology, removing a directory server replica, or adding directory servers that hold new sets of data, such as additional partitions within an entry-balanced dataset.

In an embodiment, adding a new directory server that is a replica of existing data has several implications. First, when a new directory server replica is added to the topology, each dataset that it hosts will have different replica IDs than all other replica IDs in the topology. Any changes made to the new directory will have CSNs that include the new replica ID. These changes will be returned to the sync client (once they replicate to a directory server that is processing the sync request), and the token will include a CSN for the new directory server. Second, a sync client can communicate with the new directory server (directly or indirectly through a proxy server) and use a token that it received from a different directory server (directly or indirectly through the proxy). In a topology that includes a proxy server, the proxy preferably will be configured to reference the new directory server. In a topology without a proxy server, discovery of the new directory server preferably can be done by changing the sync client's configuration or by adding the new server to a list of servers that is resolvable via the directory's domain name system.

In an embodiment in which the topology is augmented with a directory server that holds new sets of data, for example, additional partitions within an entry balanced dataset, the proxy's configuration is preferably updated to reference the servers with the new datasets. Once this is done, the proxy server preferably will respond to subsequent sync requests that cover the new data by sending a downstream sync request to a server that has the new data. For example, if a "ou=users,dc=example,dc=com Set 3" partition is added, then a sync request from the proxy server to back-end servers for requests for changes within "ou=users, dc=example,dc=com" will send requests to a server with the newly-added partition, and the new server will return all changes that have been made in this new dataset.

Significant advantages are provided by the methods, system and apparatus for synchronizing directory changes described herein. A sync client enjoys a single unified view of change log data regardless of whether the client is communicating with a single directory server, a topology of replicated directory servers, a proxy server, or a proxy server that supports multiple back-end directories in a partitioned dataset. Each response to the sync client's sync request efficiently returns the exact next set of changes requested by the client, without skipping any changes and without delivering any duplicate changes. A sync client can issue selective requests for changes, for example, changes within specified base DNs (either via included or excluded base DNs) or changes that involve specific attributes. A proxy server can efficiently implement "failover" responses from one directory server to another.

A common topology of a directory service employing the embodiments described herein might have 8 directory servers and 6 proxies, but it would not be unusual to find a topology with 40 directories and 20 proxies. A directory in an entry-balanced environment might contain 40 million entries partitioned into two entry balanced sets of 20 million entries apiece. Each 20 M-partition database would be about 30 GB on disk and cached in memory. The topology of 8 directories and 6 proxies could handle 300,000 searches per second plus in an entry-balanced environment 20,000 updates per second. A proxy server may handle 1-10 sync requests per second, and it might take 100 ms to return a batch of 500 changes. A proxy server in a commercial implementation could easily be responsible for maintaining a directory with 100 million entries and 15 different directory servers. Because of the complexity of the topology, the number of potential changes (>10K per second), and the frequency in which synchronization is invoked (several times per second), the process of synchronizing changes among different directories in a commercial installation cannot, as a practical matter, be performed by hand and must be performed by a computer.

Figure 41:
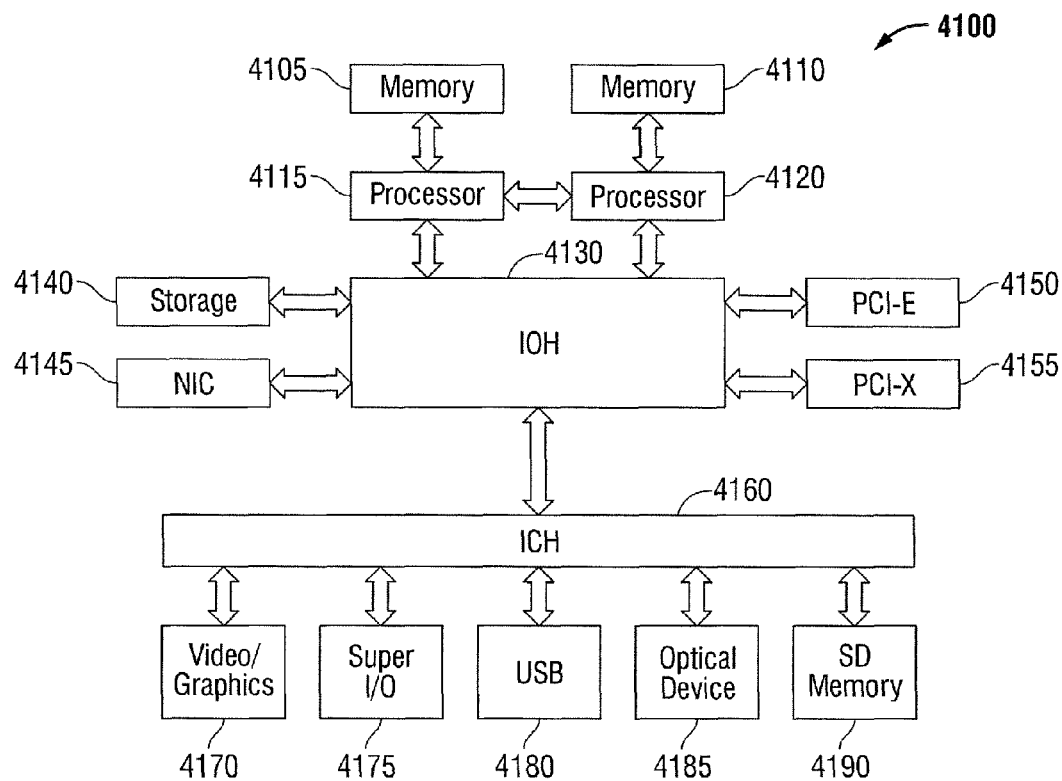
FIG. 41 is a top-level block diagram of hardware components of an exemplary computer.

With reference to FIG. 41, this figure depicts a block diagram of exemplary components of a computer 4100 in which exemplary embodiments may be implemented. Computer 4100 is an example of a computer, such as a directory server 120, 124, 130, or 115, a proxy server 180, 182, 184, or a sync server 110, 112 in FIG. 1, in which computer usable program code or instructions implementing the processes may be located for the illustrative embodiments.

In the depicted example, exemplary computer 4100 employs an architecture comprising one or more processing units 4115, 4120. Embodiments with more than one processing unit may include parallel processors. Processing units 4115, 4120 may contain one or more processors and/or multiple cores and may be implemented using one or more heterogeneous processor systems. Processors 4115, 4120 are coupled to memory 4105, 4110. Memory 4105, 4110 preferably comprises random access memory, including, preferably, a multiple-level memory cache hierarchy. Processors 4115, 4120 preferably are coupled to Input/Output Hub 4130. Input/Output Hub 4130 preferably is coupled to one or more peripheral busses, including PCI-E bus 4150 and PCI Express bus 4155. Input/Output Hub 4130 preferably is coupled to network interface controller 4145 for coupling for providing TCP/IP and ethernet connectivity. Input/Output Hub 4130 preferably is also coupled to one or more storage units 4140, including one or more hard disks, RAID arrays or Serial Attached SCSI (SAS) units. Input/Output Hub 4130 preferably is coupled to I/O Controller Hub 4160. I/O Controller Hub 4160 preferably is coupled to video/graphics chipset 4170, Super I/O (SIO) device 4175, Universal Serial Bus (USB) Controller 4180, optical drive 4185, and a slot for SD memory 4190. One or more components may be coupled to I/O Controller Hub 4160 via a PCI bus, an integrated drive electronics (IDE), or a serial advanced technology attachment (SATA) interface. Of course, the coupling between the components of computer 4100 may be implemented using any type of communications fabric or architecture that provides for a transfer of data between different components or devices attached to the fabric or architecture.

Generally, computer 4100 can be any computer embodied in hardware that provides sufficient computing power, memory, and persistent storage to perform the methods and processes and techniques of the embodiments described herein. An exemplary computer for use with embodiments of the invention is a Hewlett Packard Proliant® G6 server with dual cores and hyperthreading.

Those of skill will recognize that the methods, processes, and techniques of the embodiments described herein may be implemented to advantage in a variety of sequential orders and that the present invention may be generally implemented in a physical medium, preferably magnetic or optical media such as RAM, RAM drives, USB drives, SD memory, disks, tapes, DVDs and CD-ROMs or other storage media, for introduction into a directory service configured to synchronize changes described herein. In such cases, the media will contain program instructions embedded in the media that, when executed by one or more processing units, will execute the steps and perform the methods, processes, and techniques described herein of synchronizing changes in a directory service.

Figure 40:
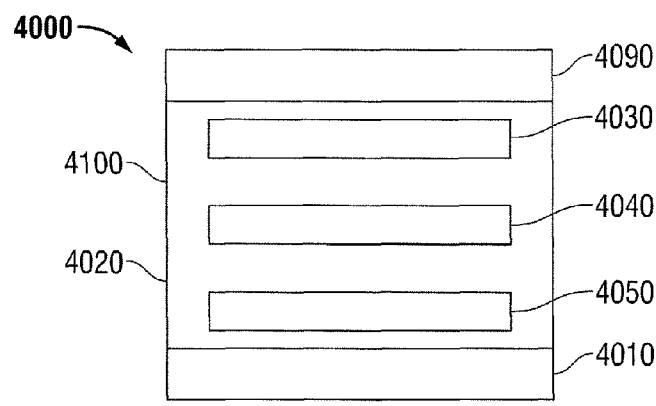
FIG. 40 is top-level block diagram of software components of an exemplary computer.

FIG. 40 depicts exemplary software components 4000 of a computer 4100 (FIG. 41) in an exemplary embodiment. Memory 4090 in FIG. 40 preferably comprises memory 4105, 4110. An operating system 4010 runs on processing units 4115, 4120. The operating system 4010 coordinates and provides control of various components within computer 4100 in FIG. 41. Exemplary operating systems 4010 include commercially available operating systems such as Solaris® (Solaris is a trademark of Oracle America, Inc. in the United States and other countries) or Linux® (Linux is a trademark of Linus Torvalds in the United States and other countries). An object oriented programming system, such as the Java programming system, may be implemented in a Java Virtual Machine 4020 executing in conjunction with the operating system 4010 (Java is a trademark of Oracle America, Inc., in the United States and other countries). Software components 4090 in a computer used in an exemplary embodiment of a directory service may include zero or one or more directory servers 4030, zero or one or more proxy servers 4040, and zero or one or more sync servers 4050, each preferably implemented as a Java application and executed as an independent process in Java Virtual Machine 4020.

Data and instructions for the operating system 4010, the object oriented programming system, Java Virtual Machine 4020, and applications or programs are located on storage devices, such as HD/SAS units 4140, and may be loaded into main memory 4105, 4110 for execution by processing units 4115, 4120. Java Applications may contain instructions that are loaded into the portion of memory 4105, 4110 containing Java Virtual Machine 4020 and executed by Java Virtual Machine 4120. The processes of the illustrative embodiments may be performed by processing units 4115, 4120 using computer implemented instructions, which may be located in a memory, such as, for example, memory 4105, 4110, SD memory 4190, or in one or more peripheral devices.

The depicted examples in FIGS. 41 and 40 and above-described examples are not meant to imply architectural limitations. The hardware in FIG. 41 may vary depending on the implementation. Other internal hardware or peripheral devices, such as flash memory, equivalent non-volatile memory, and the like, may be used in addition to or in place of the hardware depicted in FIG. 41. In addition, the processes of the illustrative embodiments may be applied to a multiprocessor data processing system. In additional the processes of the illustrative embodiments may be encoded in a programming system other than Java, and may be executed under an operating system other than Linux or Solaris.

Although embodiments of the present invention has been described in detail, it will be apparent to those skilled in the art that many embodiments taking a variety of specific forms and reflecting changes, substitutions and alterations can be made without departing from the spirit and scope of the invention. The described embodiments illustrate the scope of the claims but do not restrict the scope of the claims.

What is claimed is:

1. A method of synchronizing changes in a directory service comprising a proxy server coupled to a first and second directory server, comprising:
   (a) the proxy server receiving from a sync client an initial sync request, the initial sync request comprising an initial sync request parameter and an initial token, wherein the proxy server sends a sequence of sync requests to directory servers, and wherein the sequence of sync requests includes a first sync request and a second sync request;

(b) sending to the first directory server the first sync request to return changes previously made to a dataset, the first sync request comprising a first sync request parameter and a first token;

(c) receiving a first response from the first directory server, wherein the first response responds to the first sync request and comprises a first directory change set and a first response token, wherein the first directory change set comprises one or more changes to the dataset;

(d) sending to the second directory server the second sync request to return changes previously made to a dataset, the second sync request comprising a second sync request parameter and a second token;

(e) receiving a second response from the second directory server, wherein the second response responds to the second sync request and comprises a second directory change set and a second response token, wherein the second directory change set comprises one or more changes to the dataset and the changes in the first directory change set and the second directory change set together satisfy the initial sync request parameter; and (f) the proxy server receiving from the sync client a subsequent sync request, the subsequent sync request comprising a subsequent sync request parameter and subsequent token, wherein the initial token comprises indicia of first previous dataset changes and indicia of second previous dataset changes.

2. The method of synchronizing changes to a dataset of claim 1, wherein the first directory change set comprises changes that are new to the sync client.

3. The method of synchronizing changes to a dataset of claim 2, wherein all changes comprised in the first and second directory change sets are new to the sync client.

4. The method of synchronizing changes to a dataset of claim 2, wherein the first and second directory change sets comprise all changes that have not been previously retrieved by the sync client.

5. The method of synchronizing changes to a dataset of claim 4, wherein the first response token comprises indicia of changes in the first directory change set and the second response token comprises indicia of changes in the second directory change set.

6. The method of synchronizing changes to a dataset of claim 1, wherein the initial sync request parameter specifies that changes within a first base distinguished name are to be included and that changes to the first base distinguished name are to be excluded.

7. The method of synchronizing changes to a dataset of claim 1, wherein the initial sync request parameter specifies the type of changes that are to be returned.

8. The method of synchronizing changes to a dataset of claim 1, wherein the initial sync request parameter specifies an attribute of the changes to be returned.

9. The method of synchronizing changes to a dataset of claim 1, further comprising repeating steps (b) through (e), wherein the changes in the repeated first directory change set and the repeated second directory change set together satisfy the subsequent sync request parameter.

10. A method of synchronizing changes in a directory service comprising a proxy server coupled to a first and second directory server, comprising:

(a) the proxy server receiving from a sync client an initial sync request, the initial sync request comprising an initial sync request parameter and an initial token, wherein the proxy server sends a sequence of sync requests to directory servers, and wherein the sequence of sync requests includes a first sync request and a second sync request;

(b) sending to the first directory server the first sync request to return changes previously made to a dataset, the first sync request comprising a first sync request parameter and a first token;

(c) receiving a first response from the first directory server, wherein the first response responds to the first sync request and comprises a first directory change set and a first response token, wherein the first directory change set comprises one or more changes to the dataset;

(d) sending to the second directory server the second sync request to return changes previously made to a dataset, the second sync request comprising a second sync request parameter and a second token;

(e) receiving a second response from the second directory server, wherein the second response responds to the second sync request and comprises a second directory change set and a second response token, wherein the second directory change set comprises one or more changes to the dataset and the changes in the first directory change set and the second directory change set together satisfy the initial sync request parameter; and (f) the proxy server receiving from the sync client a subsequent sync request, the subsequent sync request comprising a subsequent sync request parameter and subsequent token, wherein the first directory change set comprises changes that are new to the sync client, wherein the first and second directory change sets comprise all changes that have not been previously retrieved by the sync client, and wherein the first token comprises the indicia of first previous dataset changes and the second token comprises indicia of second previous dataset changes.

11. The method of synchronizing changes to a dataset of claim 10, wherein all changes in the first directory change set are subsequent to the first previous dataset changes and all changes in the second directory change set are subsequent to the second previous dataset changes.

12. A method of synchronizing changes in a directory service comprising a proxy server coupled to a first and second directory server, comprising:

(a) the proxy server receiving from a sync client an initial sync request, the initial sync request comprising an initial sync request parameter and an initial token, wherein the proxy server sends a sequence of sync requests to directory servers, and wherein the sequence of sync requests includes a first sync request and a second sync request;

(b) sending to the first directory server the first sync request to return changes previously made to a dataset, the first sync request comprising a first sync request parameter and a first token;

(c) receiving a first response from the first directory server, wherein the first response responds to the first sync request and comprises a first directory change set and a first response token, wherein the first directory change set comprises one or more changes to the dataset;

(d) sending to the second directory server the second sync request to return changes previously made to a dataset, the second sync request comprising a second sync request parameter and a second token;

(e) receiving a second response from the second directory server, wherein the second response responds to the second sync request and comprises a second directory change set and a second response token, wherein the second directory change set comprises one or more changes to the dataset and the changes in the first directory change set and the second directory change set together satisfy the initial sync request parameter; and (f) the proxy server receiving from the sync client a subsequent sync request, the subsequent sync request comprising a subsequent sync request parameter and subsequent token, further comprising merging the first response token and the second response token into a unified response token.

13. The method of synchronizing changes to a dataset of claim 12 wherein the subsequent token is the unified response token.

14. A directory service comprising:

a dataset;

a first directory server comprising a first directory change set, the first directory change set comprising one or more changes to the dataset;

a second directory server comprising a second directory change set, the second directory change set comprising one or more changes to the dataset;

a sync client; and a proxy server coupled to the first directory server, the second directory server, and the sync client, wherein the proxy server sends a sequence of sync requests to directory servers, wherein the sequence of sync requests includes a first sync request and a second sync request, and wherein the proxy server is configured to collect and send to the sync client changes in the first and second directory change sets that are new to the sync client by (a) sending to the first directory server the first sync request to return changes previously made to a dataset, the first sync request comprising a first sync request parameter and a first token;

(b) receiving a first response from the first directory server, wherein the first response responds to the first sync request and includes the first directory change set and a first response token;

(c) sending to the second directory server the second sync request to return changes previously made to a dataset, the second sync request comprising a second sync request parameter and a second token; and (d) receiving a second response from the second directory server, wherein the second response responds to the second sync request and comprises the second directory change set and a second response token, wherein the proxy server is further configured to receive from the sync client an initial sync request, the initial sync request comprising an initial sync request parameter and an initial token and the changes in the first directory change set and the second directory change set together satisfy the initial sync request parameter, and wherein the initial token comprises indicia of first previous dataset changes and indicia of second previous dataset changes.

15. The directory service of claim 14, wherein the proxy server is further configured to receive from the sync client a subsequent sync request, the subsequent sync request comprising a subsequent sync request parameter and subsequent token.

16. The directory service of claim 14, wherein the proxy server is further configured to repeat steps (a) through (d), wherein the changes in the repeated first directory change set and the repeated second directory change set together satisfy the subsequent sync request parameter.

17. A directory service comprising:

a dataset;

a first directory server comprising a first directory change set, the first directory change set comprising one or more changes to the dataset;

a second directory server comprising a second directory change set, the second directory change set comprising one or more changes to the dataset;

a sync client; and a proxy server coupled to the first directory server, the second directory server, and the sync client, wherein the proxy server sends a sequence of sync requests to directory servers, wherein the sequence of sync requests includes a first sync request and a second sync request, and wherein the proxy server is configured to collect and send to the sync client changes in the first and second directory change sets that are new to the sync client by (a) sending to the first directory server the first sync request to return changes previously made to a dataset, the first sync request comprising a first sync request parameter and a first token;

(b) receiving a first response from the first directory server, wherein the first response responds to the first sync request and includes the first directory change set and a first response token;

(c) sending to the second directory server the second sync request to return changes previously made to a dataset, the second sync request comprising a second sync request parameter and a second token; and (d) receiving a second response from the second directory server, wherein the second response responds to the second sync request and comprises the second directory change set and a second response token, wherein the proxy server is further configured to merge the first response token and the second response token into a unified response token.

18. A directory service comprising:

a dataset;

a first directory server comprising a first directory change set, the first directory change set comprising one or more changes to the dataset;

a second directory server comprising a second directory change set, the second directory change set comprising one or more changes to the dataset;

a sync client; and a proxy server coupled to the first directory server, the second directory server, and the sync client, wherein the proxy server sends a sequence of sync requests to directory servers, wherein the sequence of sync requests includes a first sync request and a second sync request, and wherein the proxy server is configured to collect and send to the sync client changes in the first and second directory change sets that are new to the sync client by
(a) sending to the first directory server the first sync request to return changes previously made to a dataset, the first sync request comprising a first sync request parameter and a first token;
(b) receiving a first response from the first directory server, wherein the first response responds to the first sync request and includes the first directory change set and a first response token;
(c) sending to the second directory server the second sync request to return changes previously made to a dataset, the second sync request comprising a second sync request parameter and a second token; and
(d) receiving a second response from the second directory server, wherein the second response responds to the second sync request and comprises the second directory change set and a second response token,
wherein the proxy server is further configured to wherein the subsequent token is the unified response token.

* * * * *